US011911820B2

(12) United States Patent
Matsuzawa et al.

(10) Patent No.: US 11,911,820 B2
(45) Date of Patent: Feb. 27, 2024

(54) DIE CASTING MACHINE, DIE CASTING MACHINE EQUIPPED WITH DIES, CONTROL DEVICE FOR DIE CASTING MACHINE, AND DIE CASTING PROCESS

(71) Applicant: SHIBAURA MACHINE CO., LTD., Tokyo (JP)

(72) Inventors: Shugo Matsuzawa, Musashino (JP); Masaki Fujimoto, Zama (JP); Satoru Aida, Tokyo (JP); Toshiaki Toyoshima, Zama (JP); Yuichi Maki, Izu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 133 days.

(21) Appl. No.: 17/432,394

(22) PCT Filed: Sep. 27, 2019

(86) PCT No.: PCT/JP2019/038342
§ 371 (c)(1),
(2) Date: Aug. 19, 2021

(87) PCT Pub. No.: WO2020/170490
PCT Pub. Date: Aug. 27, 2020

(65) Prior Publication Data
US 2022/0193759 A1   Jun. 23, 2022

(30) Foreign Application Priority Data
Feb. 20, 2019 (JP) .................. 2019-028549

(51) Int. Cl.
*B22D 17/32* (2006.01)
*B22D 17/00* (2006.01)
(Continued)

(52) U.S. Cl.
CPC ........... *B22D 17/32* (2013.01); *B22D 17/002* (2013.01); *B22D 17/10* (2013.01); *B22D 17/22* (2013.01); *B22D 17/26* (2013.01)

(58) Field of Classification Search
CPC ...... B22D 17/00; B22D 17/002; B22D 17/10; B22D 17/22; B22D 17/26; B22D 17/32
(Continued)

(56) References Cited

U.S. PATENT DOCUMENTS 4,586,560 A    5/1986  Ikeya
5,352,394 A *  10/1994 Fujita et al. ............ B29C 45/64
                                              425/149
(Continued)

FOREIGN PATENT DOCUMENTS

CN    087102218    9/1987
CN    102069171    5/2011
(Continued)

OTHER PUBLICATIONS

International Search Report dated Dec. 10, 2019 issued in PCT/JP2019/038342.
(Continued)

*Primary Examiner* — Kevin P Kerns
(74) *Attorney, Agent, or Firm* — DLA Piper LLP (US)

(57) ABSTRACT

A gap control part controls a clamping device so that mating surfaces in a die face each other across a gap, and thereby a cavity and an external part of the die communicate across the gap. A molten metal feed control part controls a molten metal feed device so as to feed molten metal into a sleeve when the gap is being maintained. An injection control part controls an injection device so as to start a forward movement of a plunger at a time when the gap is maintained and there is the molten metal in the sleeve. A clamping control part controls a clamping device so as to make the mating
(Continued)

surfaces abut against each other to eliminate the gap after the forward movement of the plunger is started and before the molten metal reaches a molten metal surface height at which the molten metal flows into the gap.

13 Claims, 13 Drawing Sheets

(51) Int. Cl.
*B22D 17/10* (2006.01)
*B22D 17/22* (2006.01)
*B22D 17/26* (2006.01)

(58) Field of Classification Search
USPC .................. 164/457, 155.1, 113, 303, 312
See application file for complete search history.

(56) References Cited

U.S. PATENT DOCUMENTS

| | | | |
|---|---|---|---|
| 2008/0089964 A1* | 4/2008 | Kianpour et al. | B29C 45/82 318/560 |
| 2015/0290857 A1 | 10/2015 | Tajika et al. | |
| 2017/0326630 A1 | 11/2017 | Nakata et al. | |

FOREIGN PATENT DOCUMENTS

| | | | |
|---|---|---|---|
| CN | 104972629 | 10/2015 | |
| CN | 107350449 | 11/2017 | |
| JP | S60-250867 | 12/1985 | |
| JP | S61-209761 | 9/1986 | |
| JP | S62-220263 | 9/1987 | |
| JP | H4-172162 | 6/1992 | |
| JP | 2003-340558 | 12/2003 | |
| JP | 2008-207235 | 9/2008 | |
| JP | 2009-226449 | 10/2009 | |
| JP | 2009-226449 A * | 10/2009 | ............ B22D 17/32 |
| JP | 2017-202501 | 11/2017 | |
| KR | 10-1987-0008646 | 10/1987 | |
| KR | 10-2017-0126785 | 11/2017 | |

OTHER PUBLICATIONS

Written Opinion dated Dec. 10, 2019 issued in PCT/JP2019/038342.

Chinese Office Action in Application No. 201980092693.2, dated May 12, 2023.

Korean Office Action in Application No. 10-2021-7025987, dated Jul. 27, 2023.

* cited by examiner

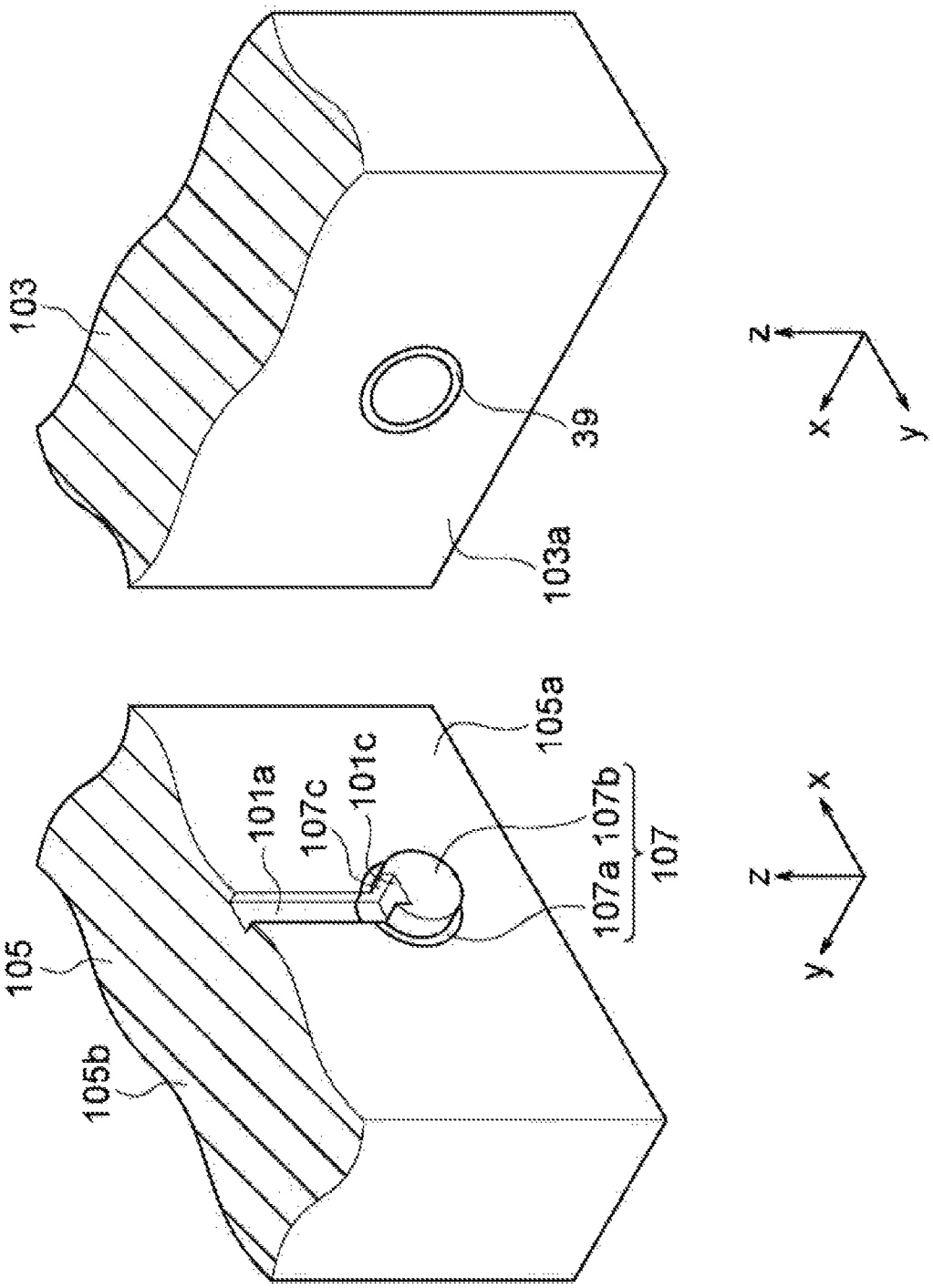

DIE CASTING MACHINE, DIE CASTING MACHINE EQUIPPED WITH DIES, CONTROL DEVICE FOR DIE CASTING MACHINE, AND DIE CASTING PROCESS

TECHNICAL FIELD

The present disclosure relates to a die casting machine, a die casting machine equipped with dies, a control device for a die casting machine, and a die casting process.

BACKGROUND ART

In a cold-chamber machine or other die casting machine, in general, a pair of dies are closed and clamped. After that, molten metal (metal in a molten state) is fed to a sleeve communicated with a cavity between the pair of dies, and the molten metal in the sleeve is injected into the cavity by a plunger. That is, first, clamping is carried out, then the molten metal is fed and injected. Due to this, for example, the molten metal fed into the sleeve is prevented from flowing out from between the mating surfaces of the pair of dies to the external part of the pair of dies.

Patent Literature 1 discloses a vertically clamping and vertically injecting die casting machine which performs an operation different from the above general operation. In this die casting machine, in a half mold-closed state where a gap is formed between the mating surfaces of an upper die and a lower die, the molten metal in the sleeve communicated with the lower die is pushed upward by the plunger. When the molten metal reaches the gate of the lower die, the plunger is stopped. After stopping the plunger, the mold is completely closed. After that, high-speed injection pushing the plunger upward at a high speed is carried out.

CITATION LIST

Patent Literature

Patent Literature 1: Japanese Patent Publication No. H04-172162

SUMMARY OF INVENTION

Technical Problem

The technique in Patent Literature 1 has various inconveniences. For example, it is predicated on vertical clamping and vertical injection, therefore has low versatility. Further, for example, the plunger must be once made to stop in the middle of pushing up the molten metal, therefore the cycle time becomes long.

It is desirable to provide a die casting machine, a die casting machine equipped with dies, a control device for the die casting machine, and a die casting process which solve at least one of such problems while can improve the degassing efficiency inside the pair of dies during injection.

Solution to Problem

A die casting machine according to one aspect of the present disclosure includes a horizontal clamping type clamping device which performs opening and closing and clamping of a pair of dies, a horizontal injection type injection device which makes a plunger move forward in a sleeve communicated with a cavity between the pair of dies to thereby inject a molten metal into the cavity, a molten metal feed device which feeds the molten metal into the sleeve, and a control device which controls the clamping device, the injection device, and the molten metal feed device. The control device includes a gap control part which controls the clamping device so as to make mating surfaces of the pair of dies face each other across a gap, and thereby the cavity and an external part of the pair of dies are communicated with each other across the gap, a molten metal feed control part which controls the molten metal feed device so as to feed the molten metal into the sleeve when the gap is being maintained, an injection control part which controls the injection device so as to start the forward movement of the plunger at the time when the gap is maintained and there is molten metal in the sleeve, and a clamping control part which controls the clamping device so as to make the mating surfaces abut against each other to eliminate the gap after the start of forward movement of the plunger and before the molten metal has reached a molten metal surface height at which the molten metal flows into the gap.

In one example, the injection control part controls the injection device so as to make the plunger move forward without stopping the plunger from the start of forward movement of the plunger in a state where the gap is maintained to when the gap is eliminated and filling of the molten metal into the cavity is completed.

In one example, the clamping control part controls the clamping device so that the clamping is completed before arrival of the molten metal at a molten metal surface height at which the molten metal flows into the gap.

In one example, the injection control part controls the injection device so as to switch the speed of the plunger from a predetermined low injection speed to a predetermined high injection speed higher than the low injection speed after the start of forward movement of the plunger. The clamping control part controls the clamping device so that the clamping is completed before the speed of the plunger is switched to the high injection speed.

In one example, the injection control part controls the injection device when the plunger has reached the predetermined high-speed switching position so as to switch the speed of the plunger from the predetermined low-speed injection speed to the predetermined high-speed injection speed higher than the low-speed injection speed. The control device has a clamping start position identifying part which identifies the position before the high-speed switching position by a predetermined movement distance as the clamping start position. The clamping control part starts the control of reducing the gap when the plunger has reached the clamping start position.

In one example, the clamping start position identifying part identifies a distance obtained by multiplying the low-speed injection speed by a predetermined clamping time as the movement distance.

In one example, the clamping start position identifying part identifies a total of the time needed up to completion of clamping from the start of reduction of the gap and a predetermined margin time as the clamping time.

In one example, the control device includes a clamping start position identifying part which acquires information concerned with a predetermined molten metal surface height, identifies a position of the plunger when the molten metal has reached the acquired predetermined molten metal surface height, and identifies a position on the front from the former position by a predetermined margin distance as the clamping start position. The clamping control part starts the control of reducing the gap when the plunger has reached the clamping start position.

In one example, the die casting machine further includes a molten metal surface sensor which detects arrival of the molten metal in the sleeve at the predetermined molten metal surface height. The clamping control part starts the control of reducing the gap at the time when arrival of the molten metal at the predetermined molten metal surface height is detected by the molten metal surface sensor.

A die casting machine according to one aspect of the present disclosure includes a clamping device which performs opening and closing and clamping of a pair of dies, an injection device which makes a plunger move forward in a sleeve communicated with a cavity between the pair of dies to thereby inject a molten metal into the cavity, a molten metal feed device which feeds the molten metal into the sleeve, and a control device which controls the clamping device, the injection device, and the molten metal feed device. The control device includes a gap control part controls the clamping device so that which makes the mating surfaces of the pair of dies face each other across a gap, and thereby the cavity and an external part of the pair of dies are communicated with each other across the gap, a molten metal feed control part which controls the molten metal feed device so as to feed the molten metal into the sleeve when the gap is being maintained, an injection control part which controls the injection device so as to start the forward movement of the plunger at the time when the gap is maintained and there is molten metal in the sleeve, and a clamping control part which controls the clamping device so as to make the mating surfaces abut against each other to eliminate the gap after the start of forward movement of the plunger and before the molten metal has reached a molten metal surface height at which the molten metal flows into the gap. The injection control part controls the injection device so as to make the plunger move forward without stopping the plunger from the start of forward movement of the plunger in a state where the gap is maintained to when the gap is eliminated and filling of the molten metal into the cavity is completed.

A die casting machine equipped with dies according to one aspect of the present disclosure includes the above die casting machine and the pair of dies held in the clamping device. The pair of dies include a flow divider which is fit in a lower side part of an opening of the sleeve on a dies side of the sleeve when the gap is being formed and dams the molten metal in the sleeve.

A control device for a die casting machine according to one aspect of the present disclosure is a control device controlling a machine body in a horizontally clamping and horizontally injecting type die casting machine and includes a gap control part which controls the machine body so that mating surfaces of a pair of dies are made to face each other across a gap, and thereby a cavity in the pair of dies and an external part of the pair of dies are communicated across the gap, a molten metal control part which controls the machine body so as to feed molten metal into a sleeve communicated with the cavity when the gap is being maintained, an injection control part which controls the machine body so as to start forward movement of a plunger in the sleeve to the pair of dies at the time when the gap is maintained and there is molten metal in the sleeve, and a clamping control part which controls the machine body so as to make the mating surfaces abut against each other to eliminate the gap after the start of forward movement of the plunger and before arrival of the molten metal at a molten metal surface height at which the molten metal flows into the gap.

A die casting process according to one aspect of the present disclosure is a die casting process using a horizontally clamping and horizontally injecting die casting machine and has a gap forming step of making mating surfaces of a pair of dies face each other across a gap, and thereby making a cavity between the pair of dies and an external part of the pair of dies communicate across the gap, a molten metal feeding step of feeding molten metal into a sleeve communicated with the cavity when the gap is being maintained, an injection step of starting forward movement of a plunger in the sleeve to the pair of dies at the time when the gap is maintained and there is molten metal in the sleeve, and a clamping step of making the mating surfaces abut against each other to eliminate the gap after the start of forward movement of the plunger and before arrival of the molten metal at a molten metal surface height at which the molten metal flows into the gap.

Advantageous Effect of Invention

According to the above configuration or procedure, a degassing efficiency of an internal part of a pair of dies during injection can be improved.

BRIEF DESCRIPTION OF DRAWINGS

FIG. 4 is a schematic perspective view showing a part on a lower side in the dies in FIG. 3A.

DESCRIPTION OF EMBODIMENTS (Overall Configuration of Die Casting Machine) FIG. 1 is a side view, including in part a cross-sectional view, which shows the configuration of a principal part of a dies-equipped die casting machine DC1 according to an embodiment.

Figure 1:
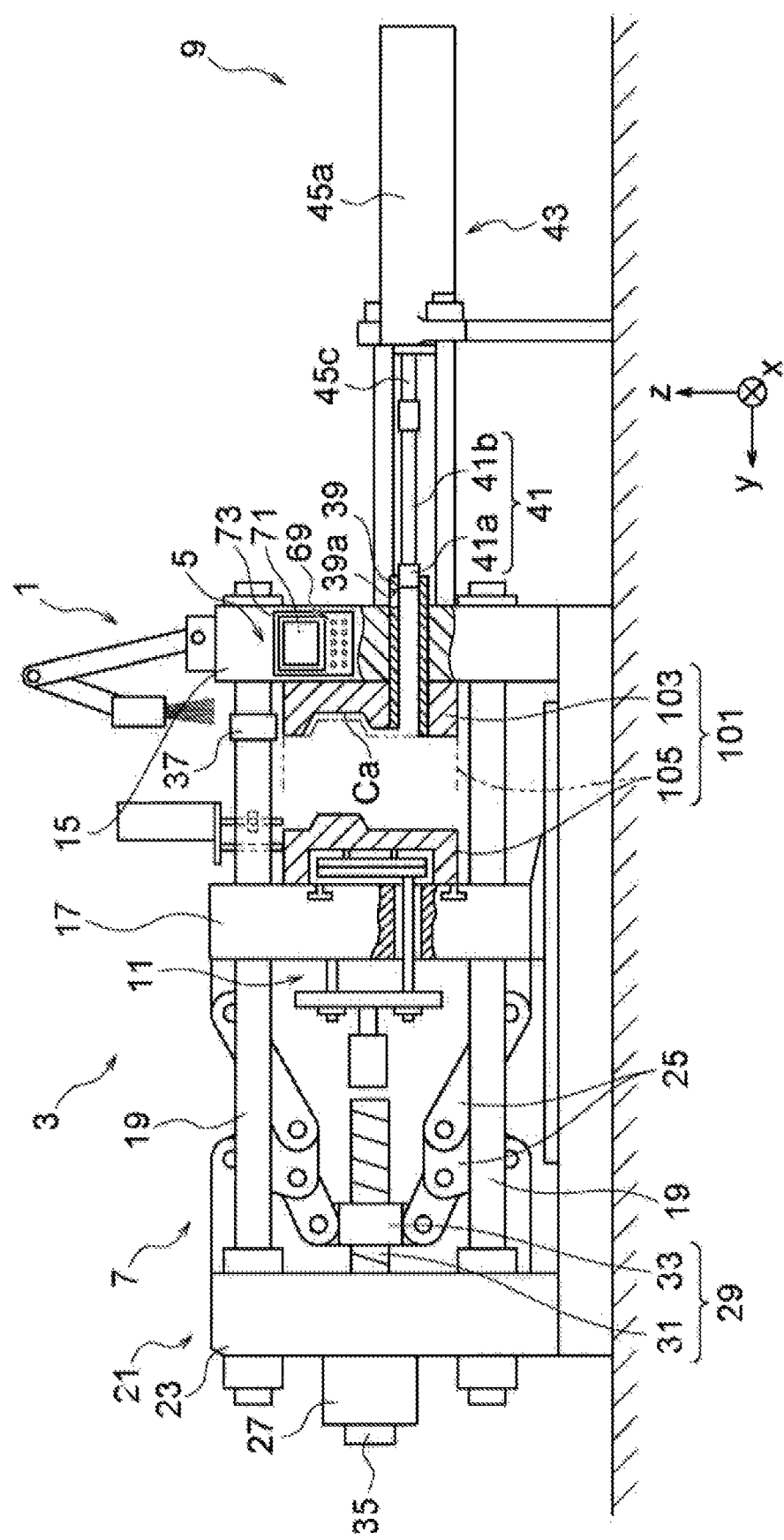
FIG. 1 is a side view showing the configuration of a principal part of a die casting machine equipped with dies according to an embodiment of the present invention.

Note that, the drawings shown below are schematic ones. Accordingly, various dimensions etc. will not always coincide with the actual dimensions. Further, sometimes details will be suitably omitted. In order to facilitate understanding of the interrelationship of the drawings, an orthogonal coordinate system xyz which is fixed with non-movable parts (for example a fixed die plate 15 which will be explained later) in the dies-equipped die casting machine DC1 will be sometimes attached to the drawings. The z-direction is, for example, a vertical direction.

The dies-equipped die casting machine DC1 includes a die casting machine 1 and die 101 held in the die casting machine 1. Note that, as will be understood from the above description, in the explanation of the present embodiment, the term "die casting machine" is defined so as not to include the die 101.

The die casting machine 1 injects a molten metal (hot metal, liquid-state metal) to an internal part (space SP shown in FIG. 3A, same is true for the following explanation) in the die 101, makes that molten metal solidify inside the die 101, and thereby manufactures a die casting product (molding product). The metal is, for example, aluminum or an aluminum alloy. Note that, the die casting machine 1 may be configured to be alternatively utilized for molding a solid-liquid coexisting metal as well.

The die 101 includes a fixed die 103 and movable die 105. Although not particularly shown, the die 101 may include cores etc. other than the fixed die 103 and movable die 105 as well.

The fixed die 103 is (basically) held in the die casting machine 1 so that it cannot move. The movable die 105 is held in the die casting machine 1 so that it can move in a mold opening/closing direction (horizontal direction on the drawing sheet in FIG. 1) relative to the fixed die 103. In FIG. 1, the mold opening state is indicated by solid lines. Further, a part of the movable die 105 in a mold closed state is indicated by dotted lines. The mold opening state is a state where the fixed die 103 and the movable die 105 are separated from each other. The mold closed state is a state where the fixed die 103 and the movable die 105 abut against each other.

In the mold opening state, a distance between the fixed die 103 and the movable die 105 is made at least a size large enough to take the die casting product from the space between the fixed die 103 and the movable die 105. Further, in the mold opening state, the movable die 105 may be positioned at the mold opening limit (driving limit on the left side on the drawing sheet) as well. The mold closed state, in the explanation of the present embodiment, is a broad concept including both of a later explained state where the dies contact each other and state where the dies are clamped together.

In FIG. 1 etc., for convenience, all or majority of the cross-section of the fixed die 103 or movable die 105 is indicated by one type of hatching. However, these dies may be directly cut ones or nesting type ones.

The die casting machine 1, for example, has a machine body 3 performing mechanical operations for molding and a control unit 5 which controls the operation of the machine body 3.

(Machine Body)

The configuration of the machine body 3 may be made the same as the configurations of various known configurations. Below, one example of the configuration of the machine body 3 will be explained. The machine body 3, for example, has a clamping device 7 which performs opening/closing and clamping of the die 101, an injection device 9 which injects molten metal to the internal part of the die 101, and an ejection device 11 which ejects the die casting product from the fixed die 103 or movable die 105 (movable die 105 in FIG. 1). Further, the machine body 3 has a molten metal feed device 13 (see FIG. 2B) which feeds the molten metal to the injection device 9.

(Clamping Device) The clamping device 7, for example, as the fundamental configuration, has a fixed die plate 15 which holds the fixed die 103, a movable die plate 17 which holds the movable die 105, and one or more (usually two or more, for example, four) tie bars 19 which bridged the two die plates.

The fixed die plate 15 and the movable die plate 17 are arranged so as to face each other and hold the fixed die 103 or movable die 105 on the facing side (front surface side) thereof. By the movable die plate 17 being moved in the facing direction with the fixed die plate 15 (mold opening/closing direction), opening/closing of the die 101 is carried out. Further, for example, in a state where the die 101 is closed (made to contact) and the tie bars 19 are fixed to the fixed die plate 15, by pulling parts in the tie bars 19 on the movable die plate 17 side to the back of the movable die plate 17 (left side on the drawing sheet), a clamping force (force fastening the die 101) in accordance with the amounts of extension of the tie bars 19 is obtained. Note that, the clamping force is maintained at a target value after it reaches the target value (clamping is continued). In the explanation of the present embodiment, however, sometimes the arrival of the clamping force at the target value will be expressed as "clamping is completed".

Further, the clamping device 7 has an electric toggle type clamping driving part 21 as the driving part for realizing opening/closing and clamping. Specifically, the clamping driving part 21, for example, has a link housing 23 positioned behind the movable die plate 17, a plurality of links 25 interposed between the link housing 23 and the movable die plate 17, and a clamping electric motor 27 giving the driving force to the plurality of links 25.

The link housing 23 is fixed with the left side parts of the tie bars 19 on the drawing sheet. Further, as explained above, the right side parts of the tie bars 19 on the drawing sheet are fixed with the fixed die plate 15. Accordingly, when a driving force is given to the plurality of links 25 by the clamping electric motor 27 and the link housing 23 and the movable die plate 17 are separated from each other, the movable die plate 17 moves toward the fixed die plate 15 and the mold is closed. If continuing to give this driving force even after mold contact and movement of the movable die plate 17 to the fixed die plate 15 side is restricted, the tie bars 19 end up being pulled to the back of the movable die plate 17, therefore a clamping force is generated.

The clamping electric motor 27 is, for example, a rotary electric motor. The rotation of the clamping electric motor 27 is, for example, transformed to translational motion by a screw mechanism 29 and is transmitted to the links 25. The screw mechanism 29, for example, has a screw shaft 31 which is restricted in movement in the axial direction relative to the link housing 23 and is rotated about its axis by the clamping electric motor 27 and has a nut 33 (cross head) which is screwed with the screw shaft 31, is connected to the links 25, and is restricted in rotation about its axis.

Further, the clamping device 7 has an encoder 35 which detects the rotation of the clamping electric motor 27 and a clamping force sensor 37 which detects the clamping force.

Although not particularly shown, the clamping device 7 may have a limit switch etc. which detects the clamping limit other than the above as well.

The encoder 35 may be an incremental type or may be an absolute type. The encoder 35 and/or control unit 5, by cumulatively adding the number of pulses generated in the encoder 35, can detect relative positions of the movable die plate 17 and the link housing 23 (link housing 23 side parts of the tie bars 19). Accordingly, the encoder 35 can detect the position of the movable die plate 17 before mold contact while can detect extension of the tie bars 19 after mold contact.

The clamping force sensor 37 is, for example, configured including a strain gauge, is attached to a part in the tie bars 19 which is extended at the clamping and generates a signal in accordance with the strain of the tie bars 19. The clamping force sensor 37 and/or control unit 5 can calculate the clamping force based on the generated signal (strain) and the information of the tie bars 19. The information of the tie bars 19 used for calculation of the clamping force is, for example, the number, Young's modulus, and cross-sectional area (diameter) of the tie bars 19.

(Injection Device) The injection device 9, for example, has a sleeve 39 communicated with the interior of the die 101, a plunger 41 able to slide in the sleeve 39, and an injection driving part 43 which drives the plunger 41. Note that, in the explanation of the injection device 9, sometimes the die 101 side will be referred to as the "front side", and the opposite side to that will be referred to as the "rear side".

By the plunger 41 sliding inside the sleeve 39 from the shown position to the front side in a state where the molten metal is arranged inside the sleeve 39, the molten metal is ejected (injected) to the internal part of the die 101. After that, by the molten metal being solidified in the die 101, the die casting product is formed.

The sleeve 39 is, for example, a tubular (for example cylindrical) member which is connected to the fixed die 103. A molten metal supply port 39a for feeding the molten metal into the sleeve 39 is formed in the upper surface. The plunger 41 has a plunger tip 41a able to slide inside the sleeve 39 in the forward and backward direction and a plunger rod 41b which is fixed at its front end to the plunger tip 41a.

Figure 2A:
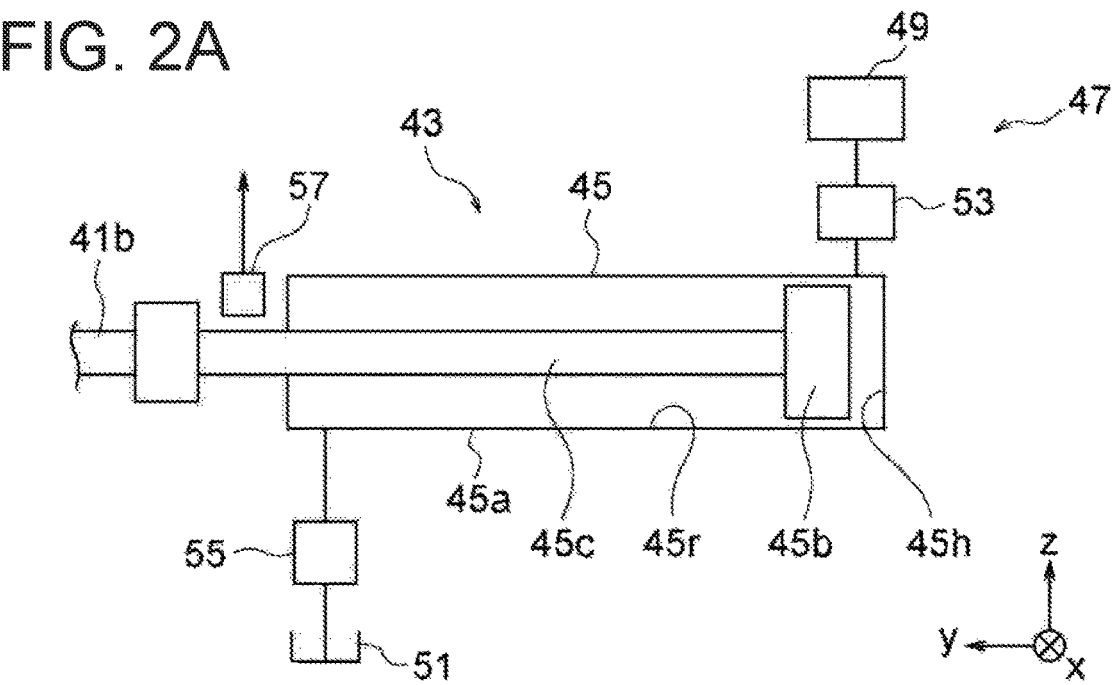
FIG. 2A is a schematic view showing one example of the configuration of an injection driving part of the die casting machine equipped with dies in FIG. 1.

FIG. 2A is a schematic view showing one example of the configuration of the injection driving part 43.

The injection driving part 43 is, for example, a liquid pressure type and is configured including an injection cylinder 45 and a liquid pressure device 47 which controls the flow of hydraulic fluid with respect to the injection cylinder 45. Note that, here, a so-called "single barrel type" injection cylinder 45 is illustrated. However, another type of injection cylinder such as a booster type may be used as well. The injection cylinder 45 has a cylinder part 45a, a piston 45b able to slide inside the cylinder part 45a, and a piston rod 45c fixed to the piston 45b.

The piston rod 45c extends outward to the front side of the cylinder part 45a and is connected with the rear end of the plunger rod 41b. The internal part of the cylinder part 45a is partitioned by the piston 45b into a rod side chamber 45r on the side where the piston rod 45c extends outward and a head side chamber 45h on the opposite side to that. By the hydraulic fluid being selectively fed to the head side chamber 45h and rod side chamber 45r, the piston 45b (plunger 41) moves forward or backward.

The liquid pressure device 47, for example, has a liquid pressure source 49 able to supply the hydraulic fluid, a tank 51 which stores the hydraulic fluid, an inflowing side valve 53 which permits or prohibits supply of the hydraulic fluid from the liquid pressure source 49 to the head side chamber 45h, and an outflow side valve 55 which permits or prohibits discharge of the hydraulic fluid from the rod side chamber 45r to the tank 51.

The liquid pressure source 49 is, for example, configured including an accumulator. The hydraulic fluid accumulated by the accumulator is discharged from the liquid pressure source 49. By the inflowing side valve 53 being opened, the hydraulic fluid being supplied from the liquid pressure source 49 to the head side chamber 45h, and the outflow side valve 55 being opened and discharge of the hydraulic fluid from the rod side chamber 45r to the tank 51 being permitted, the piston 45b moves forward.

Further, by a meter-in circuit being configured by using a flow rate control valve as the inflowing side valve 53 and/or meter-out circuit being configured by using a flow rate control valve as the outflow side valve 55, the advancing speed of the piston 45b is controlled. Note that, the flow rate control valve is, for example, a flow rate control valve with pressure compensation able to adjust the flow rate to a set value irrespective of load fluctuation etc. Further, it is a servo valve which is used in a servo mechanism and is able to continuously adjust the flow rate in accordance with the input signal.

Note that, FIG. 2A schematically shows only the principal configuration concerned with the forward movement of the piston 45b in the present embodiment. Accordingly, the liquid pressure device 47 includes components other than those shown in the drawing as well. For example, the liquid pressure device 47 has a pump which supplies the hydraulic fluid to the accumulator and/or injection cylinder 45, a flow channel which supplies the hydraulic fluid to the rod side chamber 45r so as to make the piston 45b move backward, a valve which controls the flow of the hydraulic fluid in the above flow channel, and the like. Note that, the hydraulic fluid discharged from the rod side chamber 45r may flow through a so-called run-around circuit to the head side chamber 45h as well.

The injection device 9 (die casting machine 1) has a position sensor 57 which detects the position of the plunger 41. Note that, although not particularly shown, for detecting the pressure the plunger 41 gives to the molten metal in the sleeve 39, the injection device 9 may have a pressure sensor which detects the pressure in the head side chamber 45h (or this pressure sensor and a pressure sensor which detects the pressure of the rod side chamber 45r) or another sensor as well.

The position sensor 57, for example, configures a linear encoder. For example, the position sensor 57 faces a not shown scale part in a direction perpendicular to the axial direction of the scale part and generates a pulse in accordance with the relative movement with the scale part in the axial direction. Further, the position sensor 57 and/or control unit 5 can identify the relative position of the position sensor 57 and the scale part by cumulatively adding the number of the generated pulses. Further, it can identify the speed by identifying the number of pulses per time.

Further, the position sensor 57 is provided in a fixed manner with respect to the cylinder part 45a, and the scale part is provided in the piston rod 45c or a member which is fixed to the piston rod 45c. Accordingly, by detection of the position and/or speed of the piston rod 45c, the position and/or speed of the plunger 41 is indirectly detected.

Note that, the position sensor 57 may only output the pulse or may identify the position and/or speed and output the signal in accordance with that identified position and/or speed. Even in the former case, the total number of pulses is different according to the position, therefore it can be said that a signal in accordance with the position is output. Further, the number of pulses per unit time is different according to the speed, therefore it can be said that a signal in accordance with the speed is output. The signal in the latter case is, for example, a signal which changes in signal level in accordance with the change of the position and/or speed.

The position sensor 57 may have a configuration other than a linear encoder as well. For example, the position sensor 57 may be a laser length measuring unit which is provided in a fixed manner with respect to the cylinder part 45a and measures the distance from the piston rod 45c or the member fixed with respect to the piston rod 45c.

(Ejection Device) Returning to FIG. 1, the ejection device 11, for example, although notation is not particularly attached, has ejection pins inserted in the movable die 105 in the mold opening/closing direction and an ejection driving part which drives the ejection pins in the mold opening/closing direction. The molten metal injected to the internal part of the die 101 solidifies whereby the die casting product is molded. After that, when the mold is opened, the die casting product is separated from the fixed die 103 and moves together with the movable die 105. At this mold opening or after the mold opening, the ejection pins are driven by the ejection driving part. The ejection pins protrude from the movable die 105 to the fixed die 103 side, whereby the die casting product is ejected from the movable die 105.

Figure 2B:
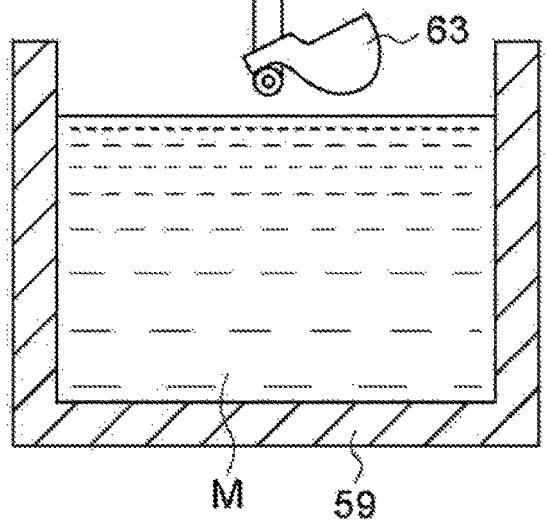
FIG. 2B is a schematic view showing one example of a molten metal feed device in the die casting machine equipped with dies in FIG. 1.

(Molten Metal Feed Device) FIG. 2B is a schematic view showing one example of a molten metal feed device 13. The molten metal feed device 13, for example, has a holding furnace 59 which holds the molten metal M and a molten metal pouring device 61 which draws 1 shot's worth of the molten metal M from the holding furnace 59 and pours it into the sleeve 39.

The holding furnace 59, for example, holds a metal material in a furnace body opened at its upper surface and heats that metal material to thereby hold it in the liquid state. Note that, the holding furnace 59 may also act as a melting furnace as well.

The molten metal pouring device 61 is, for example, configured including a ladle 63 and a ladle conveyance device 65 which conveys the ladle 63. The ladle conveyance device 65, for example, has an arm 65a holding the ladle 63, a not shown electric motor which drives the arm 65a so as to convey the ladle 63, and a not shown electric motor making the ladle 63 tilt.

The arm 65a is configured including a plurality of links (notation is omitted). Note that, in FIG. 2B, the arm 65a is schematically shown while making the number of links smaller than the actual number. The arm 65a can convey the ladle 63 from the inside of the holding furnace 59 to the top of the molten metal supply port 39a in the sleeve 39 by being driven by a not shown electric motor. Further, the ladle 63 rotates relative to the arm 65a about an axis parallel to the direction passing through the drawing sheet in FIG. 2B by transmission of the rotation of the not shown electric motor through a not shown winding transmission mechanism provided in the arm 65a. Due to this, the ladle can be made to tilt with a suitable tilt angle.

By the ladle 63 being lifted from the holding furnace 59 in a state where it is tilted with a predetermined tilt angle, molten metal corresponding to 1 shot's worth of molten metal is drawn up. Alternatively, molten metal exceeding 1 shot's worth of molten metal is drawn up by the ladle 63, then the ladle 63 is made to tilt to the predetermined tilt angle above the molten metal surface of the holding furnace 59 to thereby measure out 1 shot's worth of the molten metal. After that, the ladle 63 is conveyed to the top of the molten metal supply port 39a and the ladle 63 is made to tilt with a larger tilt angle than the above tilt angle, whereby 1 shot's worth of the molten metal is poured into the molten metal supply port 39a.

(Control Unit) Returning to FIG. 1, the control unit 5, for example, has a control device 67 (see FIG. 6) which performs various processing to output control commands, an input device 69 which receives input operations by an operator, and a display device 71 which displays an image. Further, from another viewpoint, the control unit 5, for example, has a not shown control panel having a power supply circuit and control circuit etc. and has an operation part 73 as a user interface.

The control device 67 is, for example, provided at the not shown control panel and operation part 73. The control device 67 may be configured in suitably divided or dispersed manner. For example, the control device 67 may be configured including lower control devices for the clamping device 7, injection device 9, ejection device 11, and molten metal feed device 13 and a higher control device which performs control such as synchronizing the lower control devices.

The display device 71 and input device 69 are, for example, provided in the operation part 73. The operation part 73 is provided at the fixed die plate 15 in the clamping device 7 in the example shown. The display device 71 is, for example, configured by a touch panel including a liquid crystal display or organic EL display. The input device 69 is, for example, configured by mechanical switches and the above touch panel.

Figure 3A:
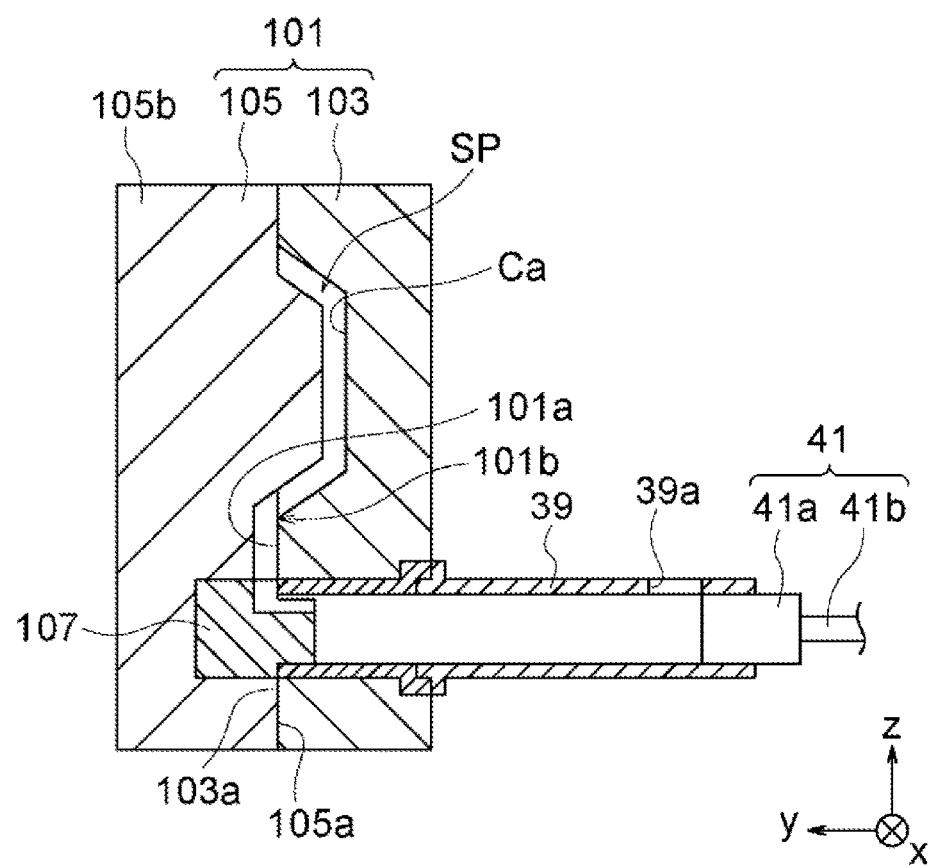
FIG. 3A is a schematic cross-sectional view showing dies etc. in the die casting machine equipped with dies.

(Die) FIG. 3A is a schematic cross-sectional view showing a die 101 etc. in the closed state.

A recessed part is formed in at least one of the surface of the fixed die 103 on the movable die 105 side and the surface of the movable die 105 on the fixed die 103 side. When the die 101 is closed, a space SP is formed in the die 101. The space SP, for example, has a cavity Ca (product part), a runner 101a (passageway) linking the cavity Ca and the sleeve 39 (casting port), and a not shown overflow part (basin) which is linked with the periphery of the cavity Ca.

The cavity Ca is a part directly forming the product and has a shape that corresponds to the shape of the product. The runner 101a is the part which guides the molten metal from the sleeve 39 to the cavity Ca. The boundary between the cavity Ca and the runner 101a is a gate 101b (sprue) and generally has the smallest cross-sectional area in the space from the sleeve 39 to the cavity Ca. In FIG. 3A etc., however, illustration of such a change of cross-sectional area is omitted. A not shown overflow part contributes to, for example, holding of excess molten metal. The shapes of these may be suitably set in accordance with the shape of the product. In the example shown, one cavity Ca is configured in one die 101. However, a plurality of cavities Ca may be configured in one die 101 as well.

The surface of the fixed die 103 which faces the movable die 105 has a surface (notation is omitted) forming the inner surface of the space SP and a mating surface 103a positioned on the periphery of that. In the same way, the surface of the movable die 105 facing the fixed die 103 has a surface (notation is omitted) forming the inner surface of the space SP and a mating surface 105a positioned on the periphery of that. The mating surfaces 103a and 105a are basically configured so as to surround the surfaces forming the space SP. When the closing and clamping the mold, the mating surface 103a and the mating surface 105a abut against each other. Due to this, the space SP is basically sealed. The mating surfaces 103a and 105a are divided surfaces of the die 101 from another viewpoint.

Note that, by provision of a chill vent (not shown) or the like, even in a state where clamping is carried out, a gap making the space SP and the external part of the die 101 communicate with each other may be present in part of the periphery of the space SP as well. Further, in part of the periphery of the space SP, a not shown core may be sandwiched between the fixed die 103 and the movable die 105 as well. In this way, the mating surfaces 103a and 105a which directly abut against each other in the clamping need not cover the entire circumference of the space SP.

The sleeve 39 is inserted in the fixed die 103. One end is opened in the surface of the fixed die 103 which faces the movable die 105. The front end surface of the sleeve 39 is, for example, positioned in its entirety on the same plane as the mating surface 105a. However, part or all of the front end surface of the sleeve 39 may be offset in the axial direction (y-direction) of the sleeve 39 relative to the mating surface 105a as well. The sleeve 39 may be configured by a combination of a plurality of members as illustrated in FIG. 3A as well.

The movable die 105 is provided with a flow divider 107. In the explanation of the present embodiment, the flow divider 107 is grasped as configuring part of the movable die 105, therefore sometimes the part other than the flow divider 107 in the movable die 105 will be referred to as a die body 105b. The flow divider 107, in the movable die 105, configures the part receiving the flow of the molten metal from the sleeve 39. In the movable die 105, a part which receives the flow of the molten metal from the sleeve 39 is apt to be consumed more heavily by the molten metal compared with the other parts. Therefore, in general, the above part is configured by the flow divider 107 as a part separate from the other parts (die body 105b). The configuration and material of the flow divider 107 may be made the same as various conventionally known ones. In the following explanation, one example of the configuration of the flow divider 107 will be shown.

Figure 3B:
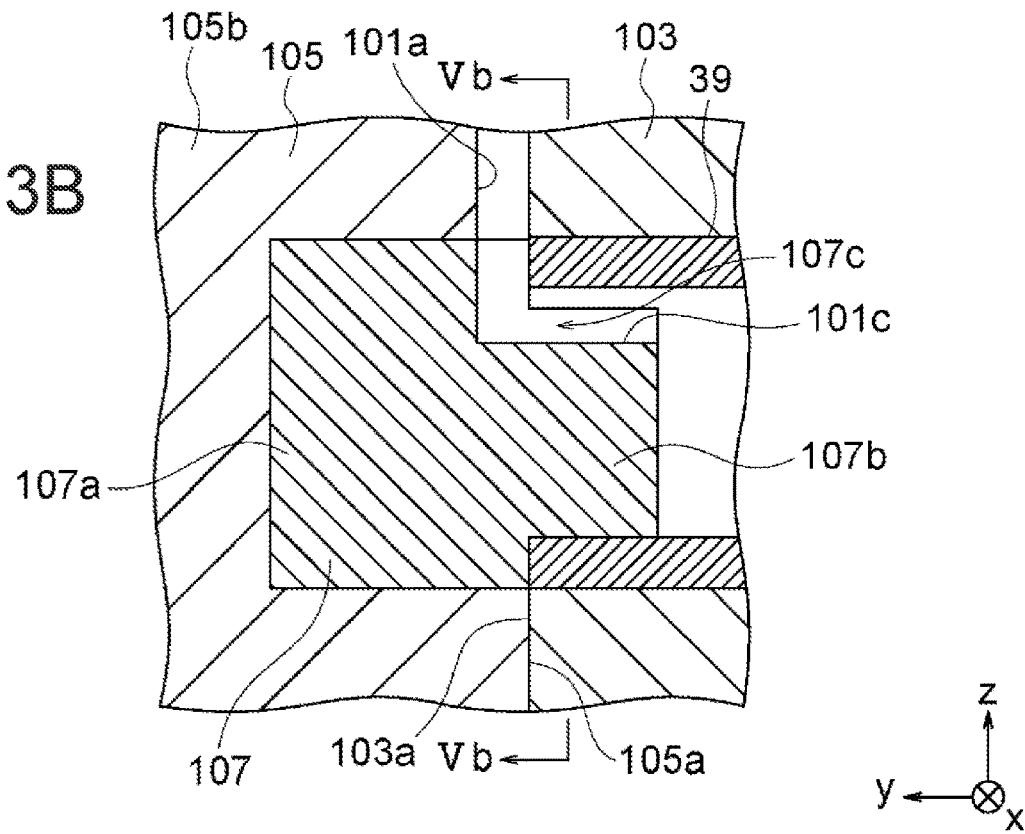
FIG. 3B is an enlarged view of a part of FIG. 3A.
Figure 5A:
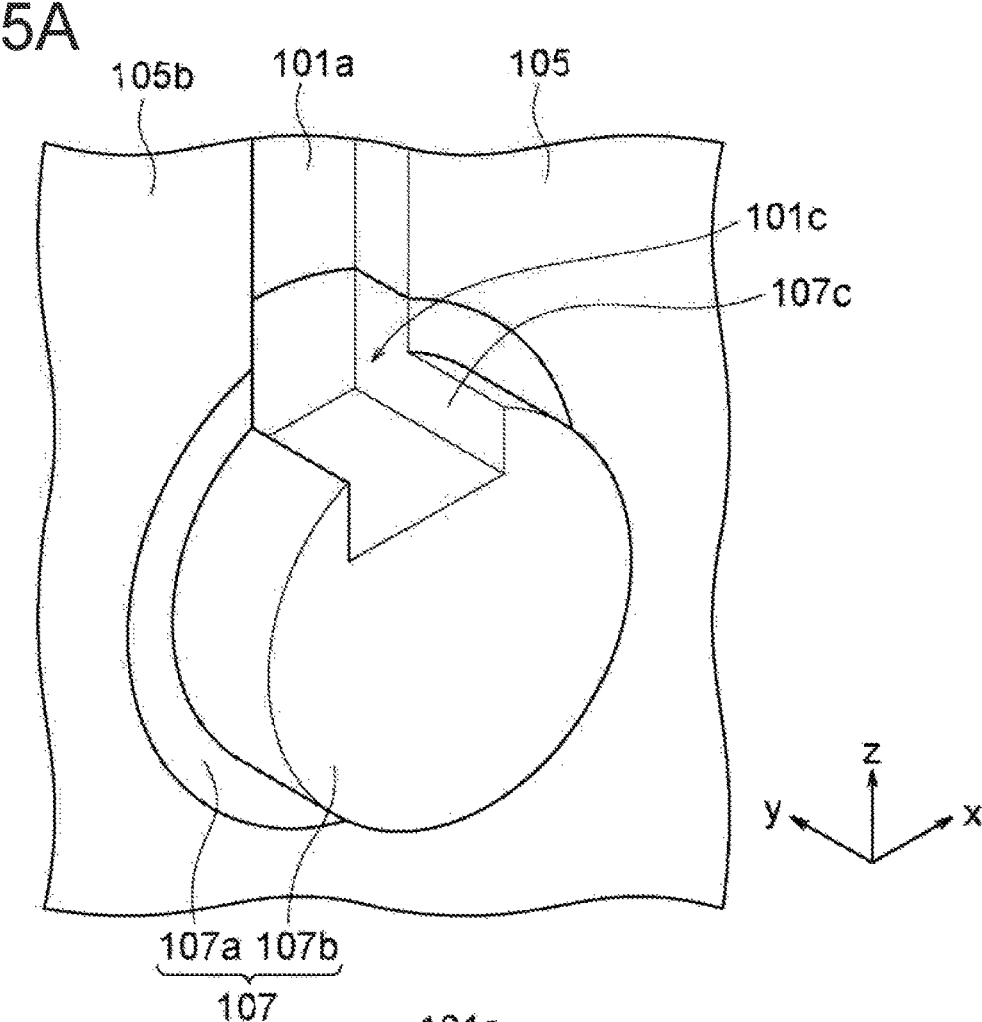
FIG. 5A is an enlarged view of a part of FIG. 4.
Figure 5B:
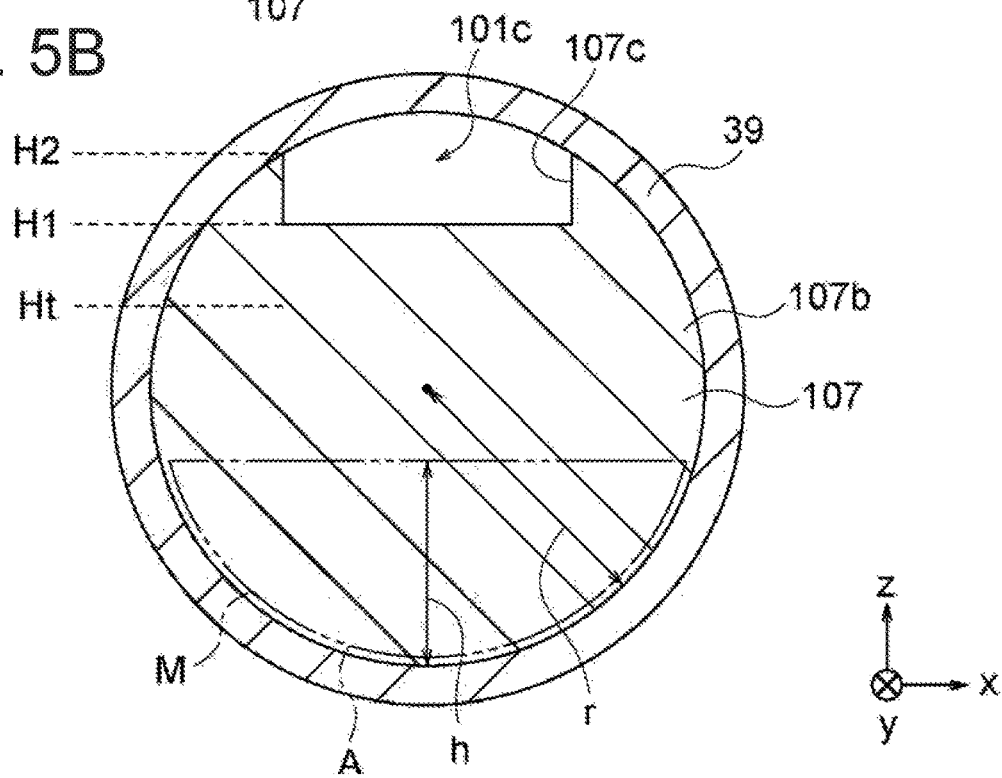
FIG. 5B is a cross-sectional view taken along the Vb-Vb line in FIG. 3B.

FIG. 3B is a cross-sectional view showing the flow divider 107 and its periphery in FIG. 3A in an enlarged manner. FIG. 4 is a schematic perspective view showing part of the lower side of the die 101. FIG. 5A is a perspective view showing the flow divider 107 and its periphery in FIG. 4 in an enlarged manner. FIG. 5B is a cross-sectional view taken along the Vb-Vb line in FIG. 3B.

The flow divider 107 has an attachment part 107a which is buried in the die body 105b in the movable die 105 and a protrusion part 107b which protrudes from the surface (mating surface 105a etc.) of the die body 105b on the fixed die 103 side. Note that, as already explained, the die body 105b may be a directly cut type or may be nesting type. In the latter case, although not particularly shown, the attachment part 107a is, for example, buried in the die body 105b so as to straddle the main mold and insert. Note that, the same is true for the sleeve 39.

The flow divider 107 is made a shape able to close the opening of the sleeve 39 in the mold closed state from which part on the upper side is removed. That removed part configures a flow channel 101c which continues from the sleeve 39 to the runner 101a. Note that, this flow channel 101c may be grasped as part of the runner 101a as well. In the explanation of the present embodiment, however, for convenience, it is expressed as a part different from the runner 101a.

In more detail, the protrusion part 107b in the flow divider 107 is, for example, given made a shape where a recessed groove 107c is formed in the upper surface of the columnar shape fit in the sleeve 39. This recessed groove 107c is a part configuring the part of the flow channel 101c which is connected to the sleeve 39 and extends from the front end of the protrusion part 107b toward the attachment part 107a. The amount of protrusion of the protrusion part 107b and the width and depth of the recessed groove 107c may be suitably set. Note that, the protrusion part 107b may be formed in a cone shape that is reduced in diameter toward the front end as well. Further, the protrusion part 107b may be given made a shape where the recessed groove 107c is not formed, but part on the upper side is cut away in a substantially horizontal plane as well.

The schematic shape of the attachment part 107a in the flow divider 107 may be a suitable shape such as columnar shape (example shown) or cuboid shape or the like. The attachment part 107a has an exposed surface (notation is omitted) which is exposed from the die body 105b to the fixed die 103 side. This exposed surface is formed so as to surround the protrusion part 107b and abuts against the front end surface of the sleeve 39. Note that, this exposed surface may abut also against the fixed die 103 (peripheral part of the sleeve 39) as well. This exposed surface is, for example, basically formed in a planar state. Further, a recessed groove (notation is omitted) forming part of the flow channel 101c is formed in the exposed surface. Note that, in addition to or in place of formation of the recessed groove in the attachment part 107a, a recessed part configuring the flow channel 101c may be formed in the front end of the sleeve 39 as well.

Figure 6:
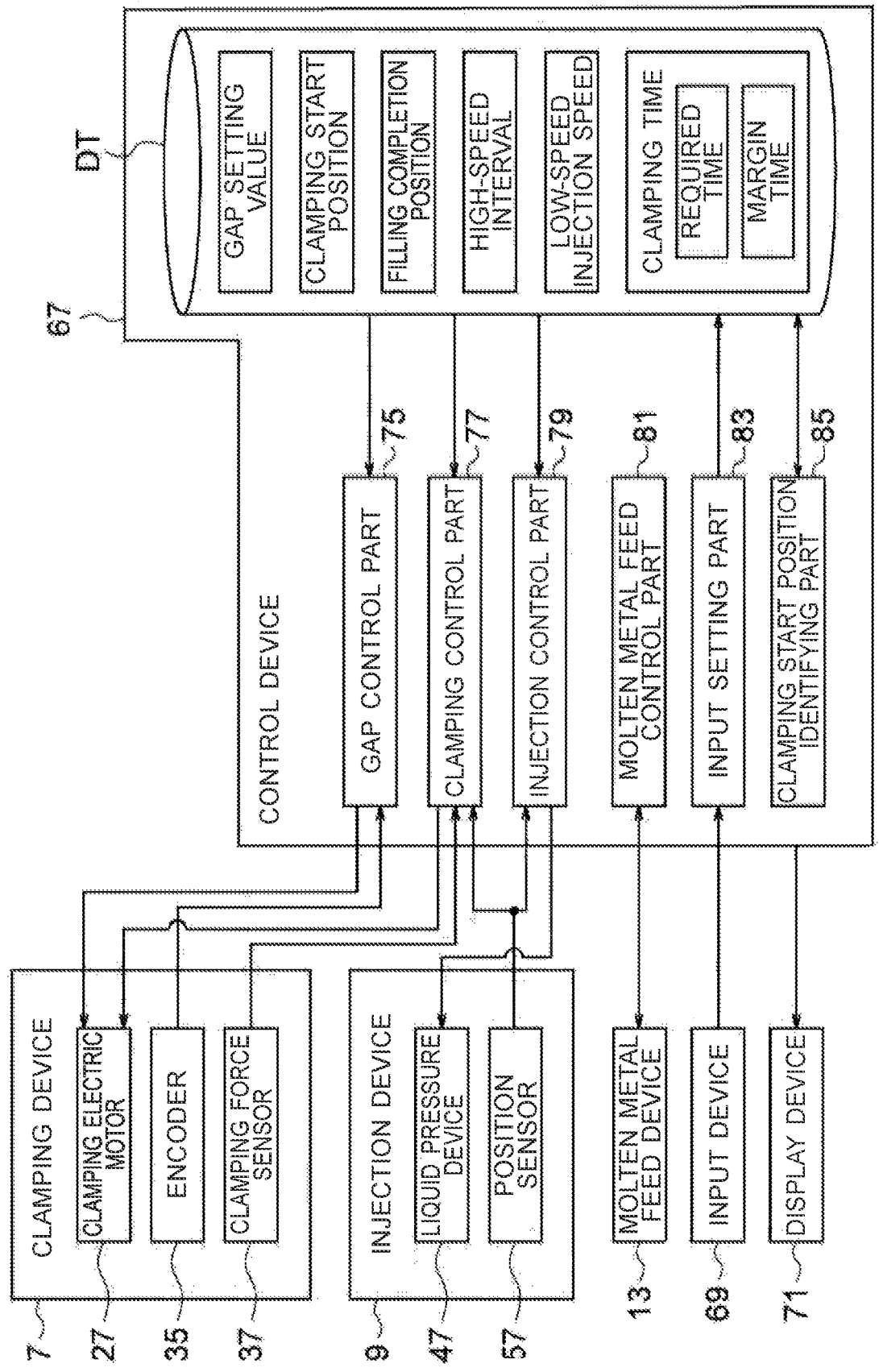
FIG. 6 is a block diagram showing the configuration according to a signal processing system in the die casting machine equipped with dies in FIG. 1.

(Configuration of Signal Processing System) FIG. 6 is a block diagram showing the configuration according to a signal processing system in the die casting machine 1.

The control device 67, for example, although not particularly shown, is configured by a computer including a CPU, RAM, ROM, and external storage device. By the CPU running programs stored in the ROM and external storage device, a plurality of functional parts (75, 77, 79, 81, 83, and 85) carrying out various control or processing are constructed. Further, in the external storage device (may be RAM temporarily) data DT including information utilized for control is stored.

In the plurality of functional parts constructed in the control device 67, the gap control part 75 and clamping control part 77 control the clamping device 7. The injection control part 79 controls the injection device 9. The molten metal feed control part 81 controls the molten metal feed device 13. Details of control carried out by these functional parts will be explained in the explanation of the operation (FIG. 11 etc.) which will be given later.

The input setting part 83, based on the signal from the input device 69, sets or updates the information held in the data DT. The clamping start position identifying part 85 identifies the clamping start position referred to by the clamping control part 77 in the information held in the data DT. The various information and the clamping start position held in the data DT will be explained in the explanation of the operation (FIG. 11 etc.) which will be given later.

(Outline of Casting Cycle) FIG. 7A to FIG. 9B are cross-sectional views schematically showing the outline of the casting cycle executed by the die casting machine 1. The casting cycle proceeds from FIG. 7A to FIG. 9B.

Figure 7A:
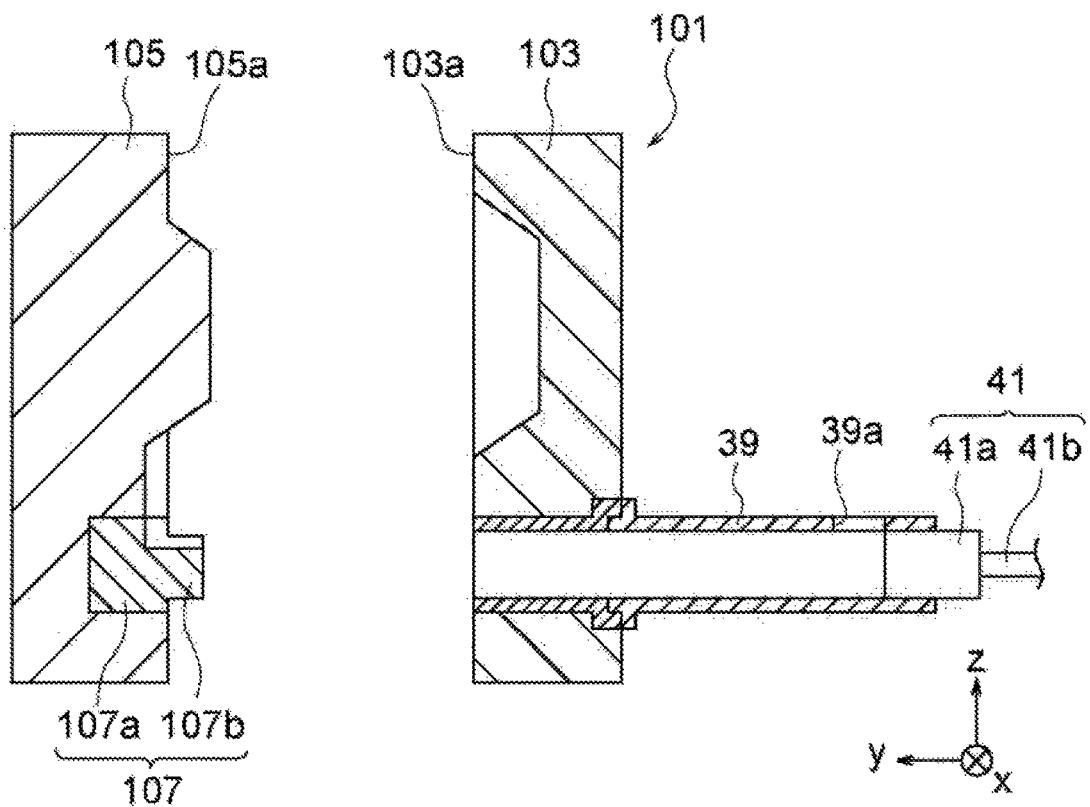
FIG. 7A and FIG. 7B are cross-sectional views schematically showing an outline of a casting cycle executed by the die casting machine equipped with dies in FIG. 1.

As shown in FIG. 7A, at the time of start of the casting cycle, the movable die 105 is arranged at the predetermined mold opening position where it is relatively separated from the fixed die 103 and the die 101 are made the mold opening state.

Figure 7B:
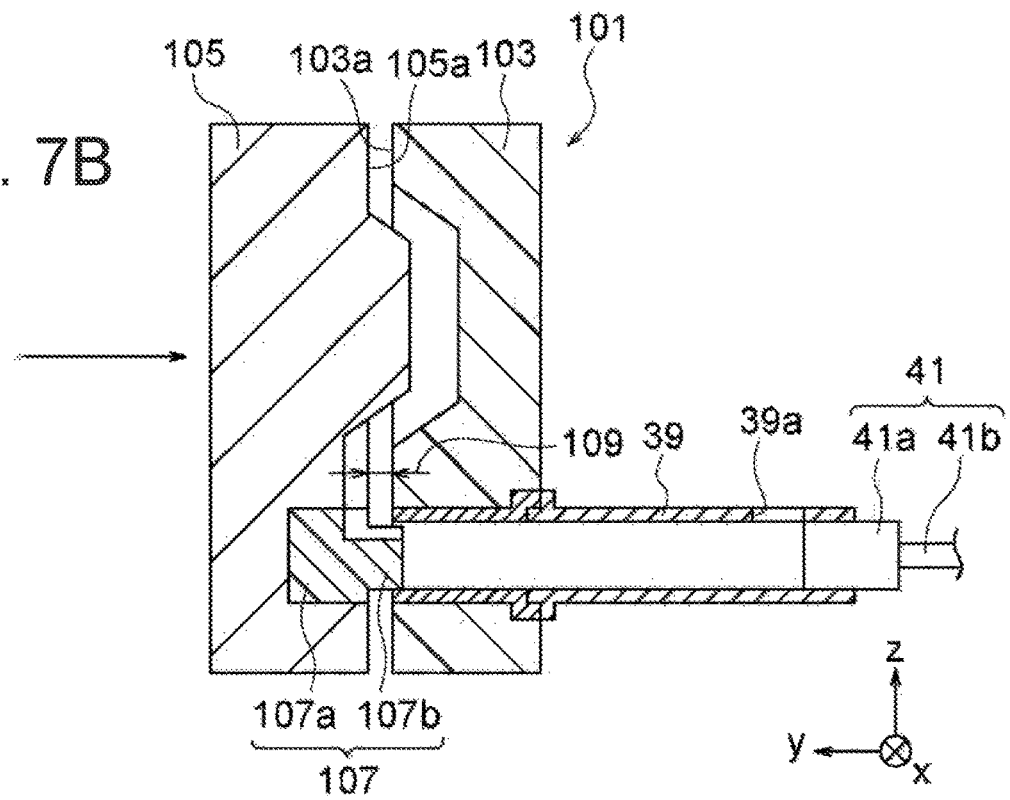

Next, as shown in FIG. 7B, the movable die 105 is driven toward the fixed die 103 by the clamping device 7, and the mold is closed. This mold closing is carried out up to before the movable die 105 abuts against the fixed die 103 (before mold contact). In other words, the fixed die 103 and the movable die 105 face each other in a state where the gap 109 is configured between the mating surface 103a and the mating surface 105a. The gap 109 makes the internal part of the die 101 and the external part of the die 101 communicate with each other.

The internal part of the die 101 referred to here designates a part in the space between the fixed die 103 and the movable die 105, and the above part forms the space SP (FIG. 3A) when the mold is completely closed. That is, the internal part of the die 101 designates a region sandwiched by the regions forming the inner surfaces of the space SP in the mutually facing surfaces of the fixed die 103 and movable die 105.

The size of the gap 109 (distance between the mating surface 103a and the mating surface 105a, the same is true for the following explanation) is smaller than the amount of protrusion of the protrusion part 107b in the flow divider 107. Accordingly, the front end of the protrusion part 107b fits with the front end of the sleeve 39. That is, the opening in the front end of the sleeve 39 is closed from the lower end up to a predetermined height.

Figure 8A:
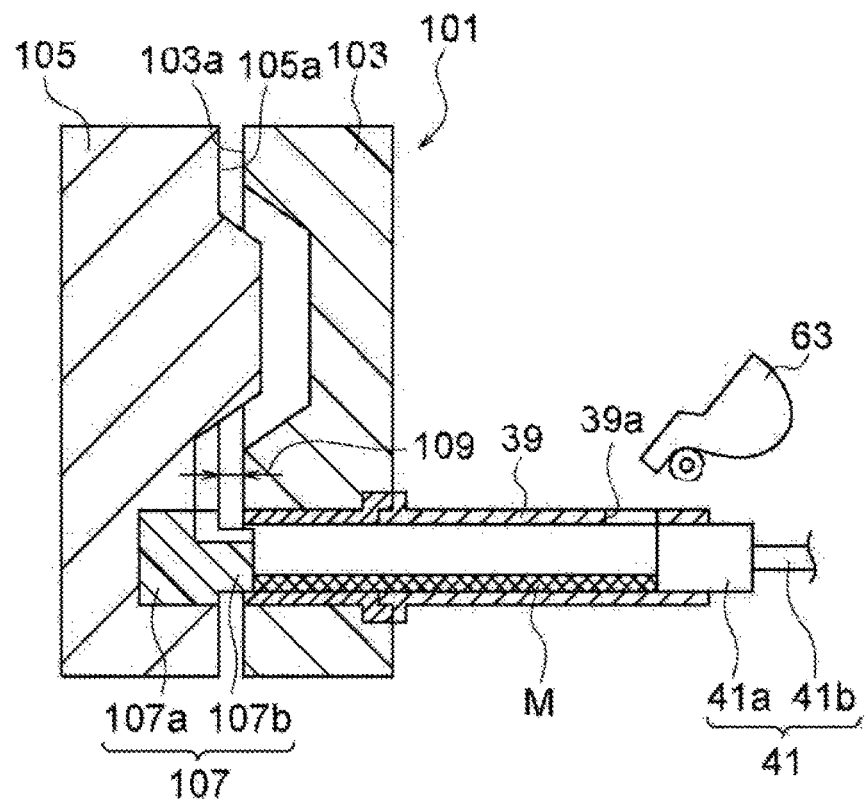
FIG. 8A and FIG. 8B are cross-sectional views showing a continuation of FIG. 7B.

Next, as shown in FIG. 8A, the molten metal M is fed to the sleeve 39 by the molten metal feed device 13. By closing of the opening in the front end of the sleeve 39 by the flow divider 107 from the lower end up to a predetermined height, the molten metal M does not flow into the gap 109 and in turn does not flow out to the external part of the die 101.

Figure 8B:
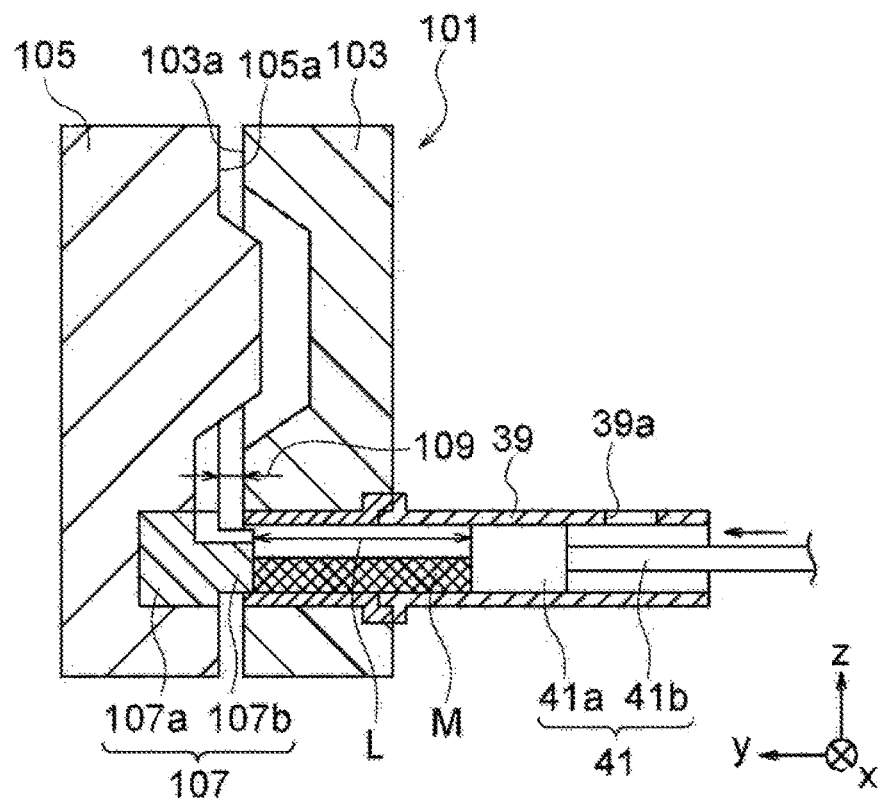

Next, as shown in FIG. 8B, injection is started by the injection device 9. That is, forward movement of the plunger 41 is started. Along with the forward movement of the plunger 41, the molten metal surface of the molten metal M rises. However, in the same way as before the start of injection, due to closing of the opening in the front end of the sleeve 39 by the flow divider 107 from the lower end up to the predetermined height, the molten metal M does not flow into the gap 109 and in turn does not flow out to the external part of the die 101.

When the plunger 41 moves forward in the state where the mold is completely closed as shown in FIG. 3A and FIG. 3B, the gas (for example air) in the sleeve 39 is ejected by the plunger 41 and flows through the flow channel 101c and runner 101a into the cavity Ca. On the other hand, as shown in FIG. 8B, in a state where the gap 109 is configured, the gas in the sleeve 39 flows out from the gap 109 to the external part of the die 101. Due to this, degassing of the internal part of the die 101 is smoothly carried out.

Figure 9A:
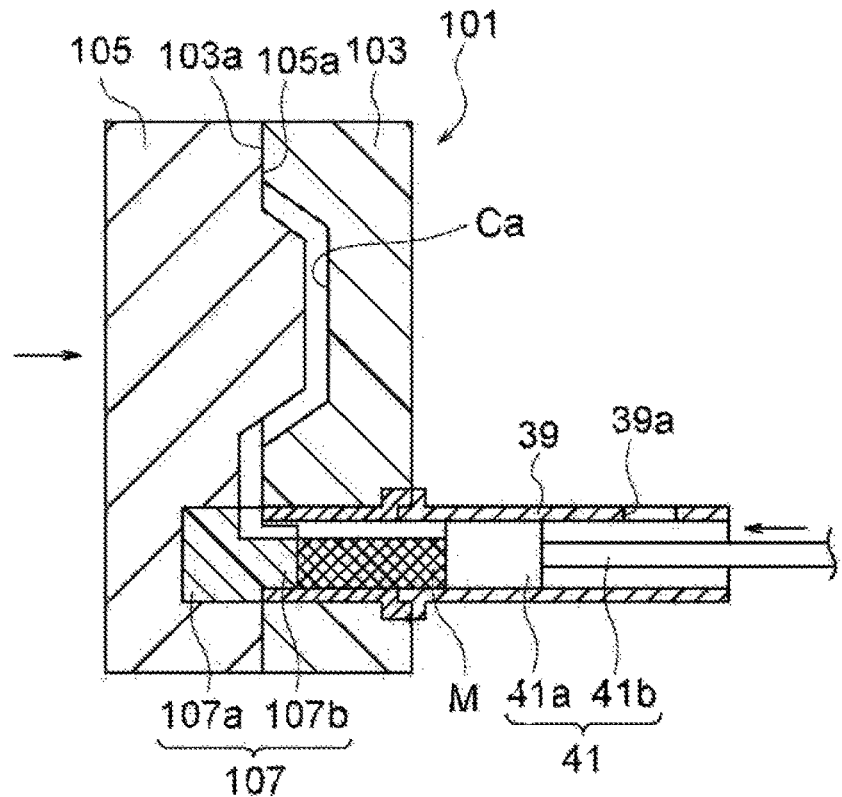
FIG. 9A and FIG. 9B are cross-sectional views showing a continuation of FIG. 8B.

As shown in FIG. 9A, in the state where the forward movement of the plunger 41 is continued, the movable die 105 is driven to the fixed die 103 side by the clamping device 7. Due to this, the gap 109 is reduced and further the mating surfaces 103a and 105a abut against each other, therefore the gap 109 is eliminated. That is, mold contact is carried out. Further, the clamping device 7 performs clamping raising the contact pressure of the mating surfaces 103a and 105a.

The clamping is, for example, carried out so as to be completed before the molten metal M reaches the molten metal surface height at which the molten metal M can flow into the gap 109. However, at least mold contact may be carried out before the molten metal M reaches such a molten metal surface height, and the clamping may be completed after the molten metal M reaches the molten metal surface height as described above. In the explanation of the present embodiment, mainly an aspect where the clamping is completed before the molten metal M reaches the molten metal surface height at which the molten metal M flows into the gap 109 will be taken as an example.

Figure 9B:
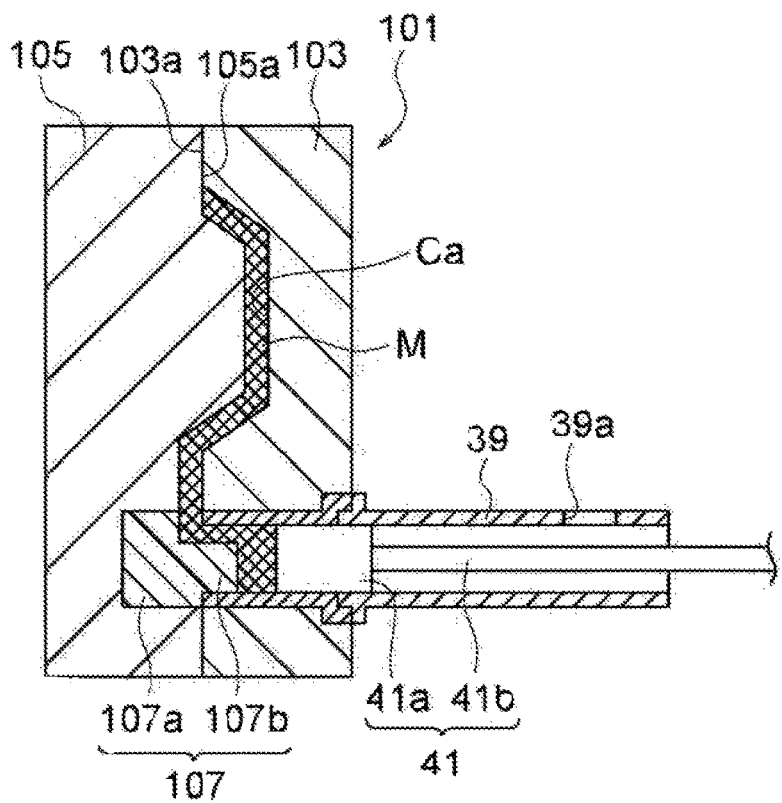

After that, as shown in FIG. 9B, by the plunger 41 continuously moving forward from the start of injection, the molten metal M in the sleeve 39 flows into the cavity Ca through the flow channel 101c and runner 101a (notation of the two is shown in FIG. 3B) and is filled in the cavity Ca. The die 101 has been already clamped, therefore the probability of the molten metal M which had flowed into the cavity Ca flowing out to the external part of the die 101 is extremely low.

Next, pressure raising (pressure increasing) making the pressure of the molten metal M in the cavity Ca rise by the plunger 41 to reach a casting pressure and pressure holding maintaining the casting pressure are carried out. After that, the mold is opened, the product is taken out, and the like and the casting cycle ends. Further, in a case where the die casting machine 1 is operated so that the casting cycle is repeatedly carried out, the next casting cycle is started.

In this way, in the die casting machine 1 in the present embodiment, the injection is not carried out in the mold clamped state, but the feed of molten metal (FIG. 8A) and start of injection (FIG. 8B are carried out in the state where the gap 109 is configured, then the clamping is carried out (FIG. 9A) and the injection is completed (FIG. 9B). By such an operation, for example, degassing in an initial stage of injection is efficiently carried out.

(Size of Gap) As described above, the size of the gap 109 may be suitably set so far as it is smaller than the amount of protrusion of the protrusion part 107b in the flow divider 107 (so far as part of a front side opening of the sleeve 39 on the lower side can be closed by the flow divider 107). The size of the gap 109 may be set by operation of the input device 69 by the operator before the start of the casting cycle, may be set by the manufacturer of the die casting machine 1, may be set by the control device 67 based on the information of the die 101, and the like. Further, the size of the gap 109 may be set for each type of the die 101 or may be set constant without regard as to the type of the die 101. The set size of the gap 109 is stored in the data DT. The specific size of the gap 109 may be suitably set. When explaining one example, the size of the gap 109 is 0.1 mm to 3.0 mm.

(Molten Metal Surface Height at Which Molten Metal Flows into Gap) As shown in FIG. 5B, the position in the vertical direction of the bottom surface of the recessed groove 107c in the flow divider 107 is defined as the molten metal surface height H1. Further, the position in the vertical direction of the upper end of the inner wall of the recessed groove 107c is defined as the molten metal surface height H2. As understood from FIG. 3B to FIG. 5B, even if the gap 109 is configured, during the period where the molten metal surface of the molten metal is positioned lower than the molten metal surface height H1, the molten metal stays in the sleeve 39 and does not flow into the gap 109. Further, if the molten metal surface exceeds the molten metal surface height H1, the molten metal begins to flow from the sleeve 39 into the recessed groove 107c. However, so far as the molten metal surface is positioned lower than the molten metal surface height H2, the molten metal does not flow into the gap 109. Further, if the molten metal surface exceeds the molten metal surface height H2, the molten metal flows into the gap 109.

Accordingly, in order to prevent the molten metal from flowing into the gap 109, mold contact or clamping in FIG. 9A is carried out at least before the molten metal reaches the molten metal surface height H2. The mold contact or clamping may be carried out after the molten metal reaches the molten metal surface height H1 up to when it reaches the molten metal surface height H2 or may be carried out before the molten metal reaches the molten metal surface height H1.

In the case where the clamping is carried out before the molten metal reaches a predetermined molten metal surface height as described above, the clamping may be completed or need not be completed when the molten metal reaches the predetermined molten metal surface height. If the clamping is not completed, the value of the clamping force at the time when the molten metal reaches the predetermined molten metal surface height may be, for example, the value which is set as the value to be reached by the arrival of the molten metal at the predetermined molten metal surface height or need not have such a special meaning. Unless particularly explained otherwise, the same is true for the following explanation.

Unlike the example shown, if a shape like one where the recessed groove 107c is not formed in the flow divider 107 and the upper side of the flow divider 107 is removed by one plane (here, assumed to be positioned at the bottom surface of the recessed groove 107c), the mold contact or clamping would be carried out before the molten metal reaches the molten metal surface height H2.

The molten metal surface height H1 and/or H2 (that is the shape of the flow divider 107) may be suitably set. These molten metal surface heights may be set in the same way as the conventional ones. Further, in order to make the distance enabling the forward movement of the plunger 41 in the state where the gap is configured as long as possible, the molten metal surface height H1 and/or H2 may be set by considering circumstances limited to the art of the present disclosure, for example, these molten metal surface heights may be made higher than the height according to the conventional setting method.

When determining the timing of the mold contact or clamping, a molten metal surface height Ht positioned lower by any margin relative to the molten metal surface height H1 and/or H2 may be set and the timing may be determined so that the mold contact or clamping is carried out at the time or before the time when the molten metal reaches this molten metal surface height Ht.

Specific values of the molten metal surface heights H1 and H2 and/or Ht may be suitably set. For example, the molten metal surface heights H1 and H2 and/or Ht may be positioned lower than a center position in the vertical direction of the flow divider 107 (sleeve 39), may coincide with the center position, or may be positioned higher than the center position. Further, from another viewpoint, at the time when the molten metal reaches the molten metal surface heights H1 and H2 and/or Ht, the filling rate of the molten metal in the sleeve 39 (ratio of occupation of the volume of the molten metal in the capacity in front of the plunger 41 in the sleeve 39) may be less than 50% or may be 50% or more.

Figure 10:
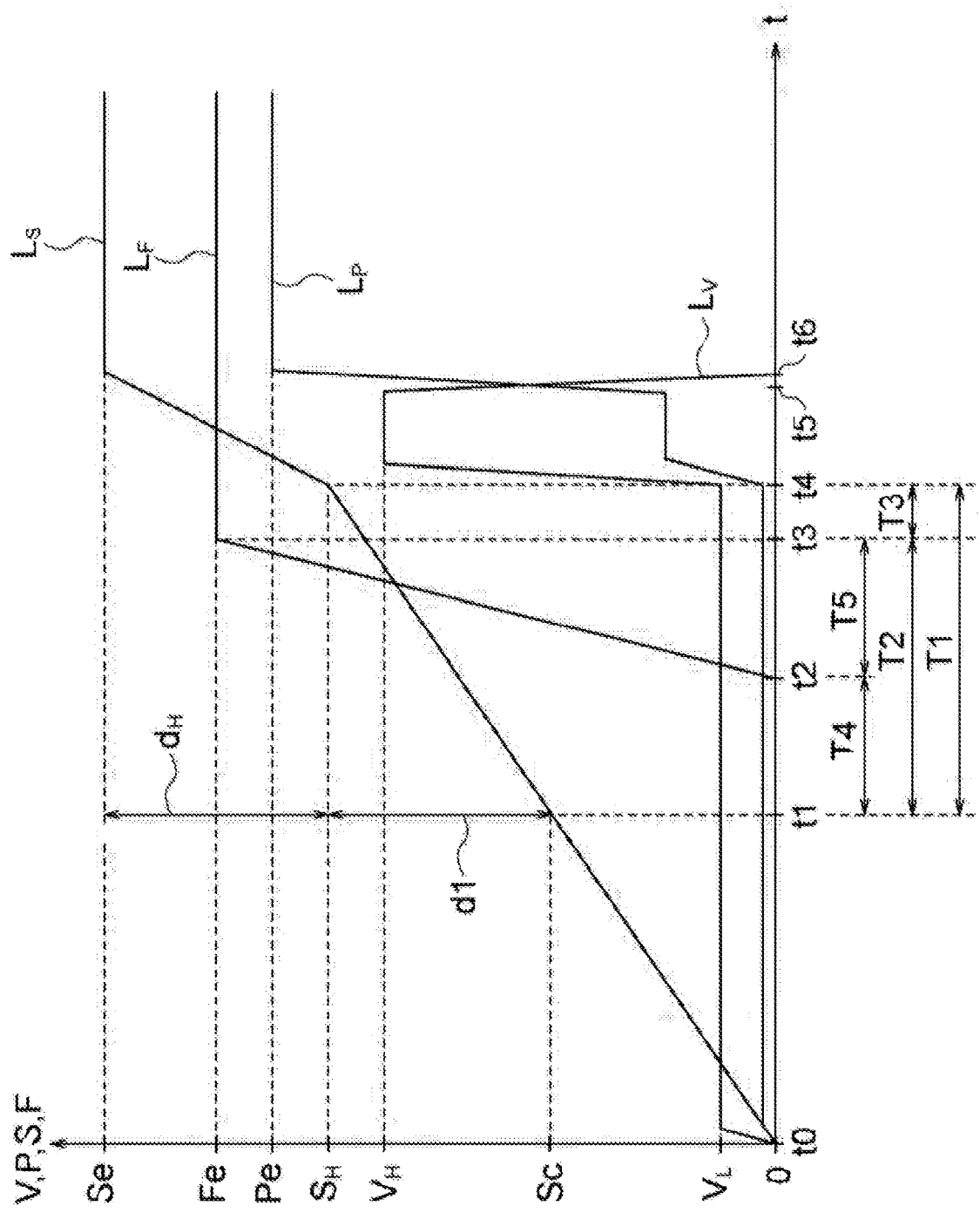
FIG. 10 is a view showing an example of changes along with time of various physical quantities in the die casting machine equipped with dies in FIG. 1.

(Changes Along With Time of Physical Quantities in Injection) FIG. 10 is a schematic line graph showing one example of changes along with time of various physical quantities in the injection.

In the same graph, an abscissa shows the time "t". An ordinate shows magnitudes of various physical quantities. The various physical quantities are an injection speed V (speed of forward movement of the plunger 41), injection pressure P (pressure given to the molten metal by the plunger 41), and position S of the plunger 41 and clamping force F (force fastening the die 101). Lines $L_V$, $L_P$, $L_S$, and $L_F$ in the graph show changes along with time of the injection speed V, injection pressure P, and position S of the plunger 41 and clamping force F.

The time "t" at the point of time of start of injection (point of time of start of forward movement of the plunger 41) is made 0. The position of the plunger 41 is defined so that it is 0 in a state where the plunger tip 41a is positioned behind the molten metal supply port 39a as shown in FIG. 7A (stand-by position at the time of molten metal feed) and the value becomes larger along with the forward movement.

Among the shown four physical quantities, the changes along with time of the injection speed V, injection pressure P, and the position S of the plunger 41 may be made the same as those in the various known die casting machines. In the present embodiment, the change along with time of the clamping force F is different from the conventional one. For example, it is as follows.

As understood from the change along with time of the injection speed V (line $L_V$), the injection device 9 performs the low-speed injection (approximately the points of time t0 to t4) making the plunger 41 move forward at a relatively the low-speed and high-speed injection (approximately the points of time t4 to t5) making the plunger 41 move forward at a relatively high speed in that order. By the low-speed injection being carried out in an initial stage of the injection, for example, entrapment of air by the molten metal is suppressed. Then, by the high-speed injection being carried out, for example, the molten metal is smoothly filled in the die 101 without delay with respect to solidification of the molten metal.

In the low-speed injection (points of time t0 to t4), the speed of the plunger 41 (the low-speed injection speed $V_L$) is relatively low, therefore the injection pressure P is relatively low. Further, when the high-speed injection is started (t4), the injection pressure P rises. Further, when the molten metal is (schematically) filled (point of time t5) in the cavity Ca by the high-speed injection, the molten metal loses a place to go, therefore the injection pressure P suddenly rises. Further, the injection speed V suddenly falls. Further, the injection pressure P reaches the casting pressure Pe (final pressure), and the injection speed V becomes 0 (point of time t6).

The position S of the plunger 41 is the integral value of the injection speed V, therefore indicates the change along with time reflecting the above change along with time of the injection speed V. Specifically, in the low-speed injection (t0 to t4), the value of the position S becomes larger by the low-speed injection speed $V_L$ as the rate of change. When it reaches the high-speed switching position $S_H$, the value of the position S becomes further larger by making the rate of change larger. Further, when the injection speed V has reached 0, the value of the position S becomes constant. That is, the plunger 41 reaches the filling completion position Se and stops.

In general, the clamping is completed before the start of injection (before the point of time t0). That is, in general, the clamping force F maintains the final clamping force Fe from the time before the point of time t0. However, as explained with reference to FIG. 7A to FIG. 9B, in the present embodiment, the clamping is carried out after the start of injection, therefore the clamping force F indicated by the line $L_F$ starts rising after the start of injection (t2).

More specifically, at the point of time t1, reduction of the gap 109 in the die 101 is started. Further, the mold contact is carried out at the point of time t2. After the mold contact, the clamping force F gradually rises and reaches the final clamping force Fe. The point of time when this final clamping force Fe is obtained (that is, the point of time of completion of clamping) is the point (point of time t3) before the start of the high-speed injection (point of time t4).

The specific magnitudes of various target values in changes along with time of the injection speed V, injection pressure P, the position S of the plunger 41 and the setting method thereof, and the like may be made the same as those in the various known die casting machines. Regarding the clamping force F as well, the specific magnitude of the target value of the final clamping force Fe and its method of setting etc. may be made the same as those in the various known die casting machines.

For example, the target values of the low-speed injection speed $V_L$, high-speed injection speed $V_H$, casting pressure Pe, and clamping force Fe are, for example, directly set or indirectly set by setting the values of related parameters by operation of the input device 69 by the operator before the start of the casting cycle, and are stored in the data DT. The low-speed injection speed $V_L$ may be, for example, set within a range less than 1 m/s. The high-speed injection speed $V_H$ is, for example, a speed faster than the low-speed injection speed $V_L$. Further, for example, it may be set within a range not less than 1 m/s. The low-speed injection speed $V_L$ and high-speed injection speed $V_H$ are, for example, constant speeds (excluding acceleration to the constant speed). However, changing speed may be carried out as well.

The switch from the low-speed injection to the high-speed injection (point of time t4) is, for example, carried out at the time when the position of the plunger 41 reaches the predetermined high-speed switching position $S_H$. The high-speed switching position $S_H$ is, for example, directly or indirectly set by operation of the input device 69 by the operator before the start of the casting cycle and is stored in the data DT. For example, the operator inputs a biscuit thickness (target value) and a length $d_H$ of the high-speed section (distance of forward movement of the plunger 41 during the high-speed injection, target value) with respect to the input device 69. Further, the control device 67 identifies the filling completion position Se (target value or predicted value) based on the biscuit thickness, subtracts the length $d_H$ (target value) of the high-speed section from that filling completion position Se, and thereby calculates the high-speed switching position $S_H$.

Note that, in the explanation of the present embodiment, the position at which the pressure increase is completed and the plunger 41 is completely stopped is defined as the filling completion position Se, and the interval from the high-speed switching position $S_H$ to the filling completion position Se is defined as the high-speed section. However, the definition of the filling completion position Se and high-speed section etc. may be suitably defined within a range not out of the gist of the art of the present disclosure. For example, the position at the point of time t5 before the pressure increase is completed and the plunger 41 is completely stopped may be defined as the filling completion position Se, and/or the section from the high-speed switching position $S_H$ to the position at the point of time t5 may be defined as the high-speed interval.

(Clamping Start Conditions) The conditions for start of reduction of the gap 109 in the die 101 may be suitably set so far as the mold contact or clamping can be carried out by the intended timing. In the present embodiment, a case where the clamping is completed before the start of high-speed injection will be taken as an example. Further, the conditions for start of reduction of the gap 109 may be, for example, made the arrival of the plunger 41 at the predetermined clamping start position Sc. The clamping start position Sc may be suitably set. In the example shown in FIG. 10, the clamping start position Sc is set in the following way.

The value of the time T2 (points of time t1 to t3) required from the start of reduction of the gap 109 to the completion of clamping is identified. Note that, for convenience, the "required time" is used. However, this time is not limited to the time required when using the driving force of the clamping device 7 up to the limit or rated value and includes also the time required when suppressing the driving force of the clamping device 7 considering various circumstances.

Further, the value of the margin time T3 (points of time t3 to t4) from the completion of clamping up to the start of the high-speed injection is set. This margin time T3, for example, contributes to lowering the probability of the high-speed injection being started before the completion of clamping due to control error or the like.

Further, the clamping time T1 obtained by totaling the required time T2 and the margin time T3 is identified and the low-speed injection speed $V_L$ (its target value) is multiplied by the clamping time T1. Due to this, the value of the distance d1 (predicted value) of movement of the plunger 41 during the clamping time T1 is calculated. The position before the high-speed switching position $S_H$ (target value) by the movement distance d1 (predicted value) is defined as the clamping start position Sc. Due to this, the clamping can be completed before the start of the high-speed injection.

The required time T2 can be divided into a time T4 (points of time t1 to t2) required from the start of reduction of the gap 109 to the mold contact and a time T5 (points of time t2 to t3) required from the mold contact to the completion of clamping.

The value of the time T4 required from the start of reduction of the gap 109 to the mold contact is, for example, identified according to the size of the gap 109 and the performance relating with the mold closing of the clamping device 7. That is, when simply considered ignoring the degree of acceleration, when the size of the gap 109 is divided by the speed of movement of the movable die 105 by the clamping device 7, the value of the time T4 is found. The clamping start position identifying part 85 in the control device 67 may identify the value of the time T4 by a suitable method. For example, the clamping start position identifying part 85 holds a map linking various values of the gap 109 and various values of the time T4 (from another viewpoint, table, below, same is true for the other maps) in the data DT. The value of the time T4 corresponding to the size of the gap 109 which is set may be identified with reference to this map. Further, the clamping start position identifying part 85 may identify the value of the time T4 by a predetermined calculation formula using the set size of the gap 109 as a parameter as well.

Note that, for example, in a case where the size of the gap 109 is constant regardless of the type of the die 101 or case where the settable range of the gap 109 is limited to a relatively narrow range, the clamping start position identifying part 85 need not perform identification of the value of the time T4 based on the size of the gap 109 and may use a predetermined value (single value regardless of the size of the gap 109) held in the data DT as the value of the time T4. The predetermined value may be, for example, set by the manufacturer of the die casting machine 1 or may be set by the operator. Further, in the above explanation, identification of the value of the time T4 in accordance with the size of the gap 109 is carried out by the clamping start position identifying part 85. However, this identification may be carried out by the operator, and the value of the time T4 may be stored in the data DT through the input device 69 and the input setting part 83 in the control device 67.

The value of the time T5 required from mold contact to the completion of clamping is, for example, identified by the final clamping force Fe and the performance of the clamping device 7 concerned with the clamping. The clamping start position identifying part 85 in the control device 67 may identify the value of the time T5 by a suitable method. For example, the clamping start position identifying part 85 may hold a map linking various values of the clamping force Fe and various values of the time T5 in the data DT and identify the value of the time T5 corresponding to the set value of the clamping force Fe with reference to this map. Further, the clamping start position identifying part 85 may identify the value of the time T5 by a predetermined calculation formula using the set value of the clamping force Fe as a parameter as well.

Note that, when the value of the clamping force Fe is constant regardless of the type of the die 101 or when the settable range of the clamping force Fe is limited to a relatively narrow range, the clamping start position identifying part 85 need not perform identification of the value of the time T5 based on the value of the clamping force Fe, but may identify the predetermined value (single value regardless of the magnitude of the clamping force Fe) held in the data DT as the value of the time T5. The predetermined value may be, for example, set by the manufacturer of the die casting machine 1 or may be set by the operator. Further, in the above explanation, identification of the value of the time T5 in accordance with the magnitude of the clamping force Fe is carried out by the clamping start position identifying part 85. However, this identification may be carried out by the operator, and the value of the time T5 may be stored in the data DT through the input device 69 and the input setting part 83 in the control device 67 as well.

The required time T2 is the sum of the times T4 and T5. The clamping start position identifying part 85 in the control device 67 identifies the value of the time T2 from the values of the times T4 and T5 which are identified as described above.

Note that, in a case where each of the times T4 and T5 has a predetermined value (single value) as described above, the clamping start position identifying part 85 need not identify the times T4 and T5, but may identify as the value of the required time T2 a predetermined value (single value) stored in advance in the data DT as the value of the required time T2. The predetermined value may be, for example, set by the manufacturer of the die casting machine 1 or may be set by the operator. Further, in a case where the time T5 is a predetermined value (single value regardless of the clamping force Fe), the values of the times T4 and T5 need not be identified, but the value of the required time T2 may be directly identified from the value of the gap 109. Otherwise, in a case where the time T4 is a constant value, the values of the times T4 and T5 need not be identified, but the value of the required time T2 may be directly identified from the value of the clamping force Fe. Further, in the above explanation, identification of the value of the required time T2 in accordance with the size of the gap 109 and/or magnitude of the clamping force Fe is carried out by the clamping start position identifying part 85. However, this identification may be carried out by the operator, and the value of the required time T2 may be stored in the data DT through the input device 69 and the input setting part 83 in the control device 67.

The value of the margin time T3 may be set by operation of the input device 69 by the operator before the start of casting cycle, may be identified by the manufacturer of the die casting machine 1, or may be set by the clamping start position identifying part 85 in the control device 67 based on the casting conditions etc. Further, the value of the margin time T3 may be set in accordance with the type of the die 101 or casting conditions or may be set to a predetermined value (single value) regardless of them. The set value of the margin time T3 is stored in the data DT and is referred to by the clamping start position identifying part 85.

As explained above, the required time T2 and margin time T3 may be made predetermined values (single values) regardless of various conditions as well. When the two are the predetermined values, the clamping start position identifying part 85 in the control device 67 need not perform processing adding the required time T2 and the margin time T3, but may identify as the value of the clamping time T1 the predetermined value (single value) which is stored in advance in the data DT as the value of the clamping time T1. This predetermined value may be, for example, set by the manufacturer of the die casting machine 1 or may be set by the user. Further, as explained above, identification of the required time T2 and margin time T3 considering various conditions need not be carried out by the clamping start position identifying part 85, but may be carried out by the operator. In this case, the operator may store the value of the clamping time T1 in the data DT through the input device 69 and the input setting part 83 in the control device 67.

In a case where identification of the value of the clamping time T1 is not carried out by the clamping start position identifying part 85, but is carried out by the operator, the value of the clamping time T1 need not be stored in the data DT through the input device 69 and the input setting part 83 in the control device 67, but the value of the movement distance d1 may be stored in the data DT through the input device 69 and the input setting part 83. Further, the clamping start position identifying part 85 may utilize the value of the movement distance d1 stored in the data DT to identify the clamping start position Sc as well. Further, not the value of the movement distance d1, but the clamping start position Sc itself may be stored in the data DT through the input device 69 and the input setting part 83 in the control device 67 and be referred to by the clamping control part 77 performing control of the clamping device 7.

In general, the high-speed switching position $S_H$ is started when the molten metal has reached the vicinity of the gate 101b (FIG. 3A). On the other hand, although according to the configuration of the die 101, in general, the molten metal surface height at which the molten metal flows into the gap 109 becomes lower than the gate 101b. Accordingly, completion of clamping before the start of the high-speed injection does not ensure the mold contact or clamping being carried out before the molten metal reaches the above molten metal surface height.

However, in many dies-equipped die casting machines DC1, if the clamping is completed before the start of the high-speed injection, it is expected that at least mold contact will be carried out before the molten metal reaches the molten metal surface height at which the molten metal flows into the gap 109. Further, in consideration of the circumstances of individual dies-equipped die casting machines DC1, the margin time T3 may be set so that the mold contact or clamping is carried out before the molten metal reaches the molten metal surface height at which it flows into the gap 109.

The high-speed injection can be classified into so-called "high speed before the gate", "high speed at the gate", and "high speed after the gate". In the "high speed before the gate", the injection speed is switched to the high-speed injection speed $V_H$ (slightly) before the arrival of the molten metal at the gate 101$b$. In the "high speed at the gate", the injection speed is switched to the high-speed injection speed $V_H$ at the time when the molten metal reaches the gate 101$b$. In the "high speed after the gate", the injection speed is switched to the high-speed injection speed $V_H$ at the time when the molten metal (slightly) passes the gate 101$b$. When the clamping is carried out so that the clamping is completed before the start of high-speed injection as described above, by employing the "high speed before the gate", the reliability of the mold contact or clamping being carried out before the molten metal reaches the molten metal surface height at which the molten metal flows into the gap 109 may be improved as well.

Figure 11:
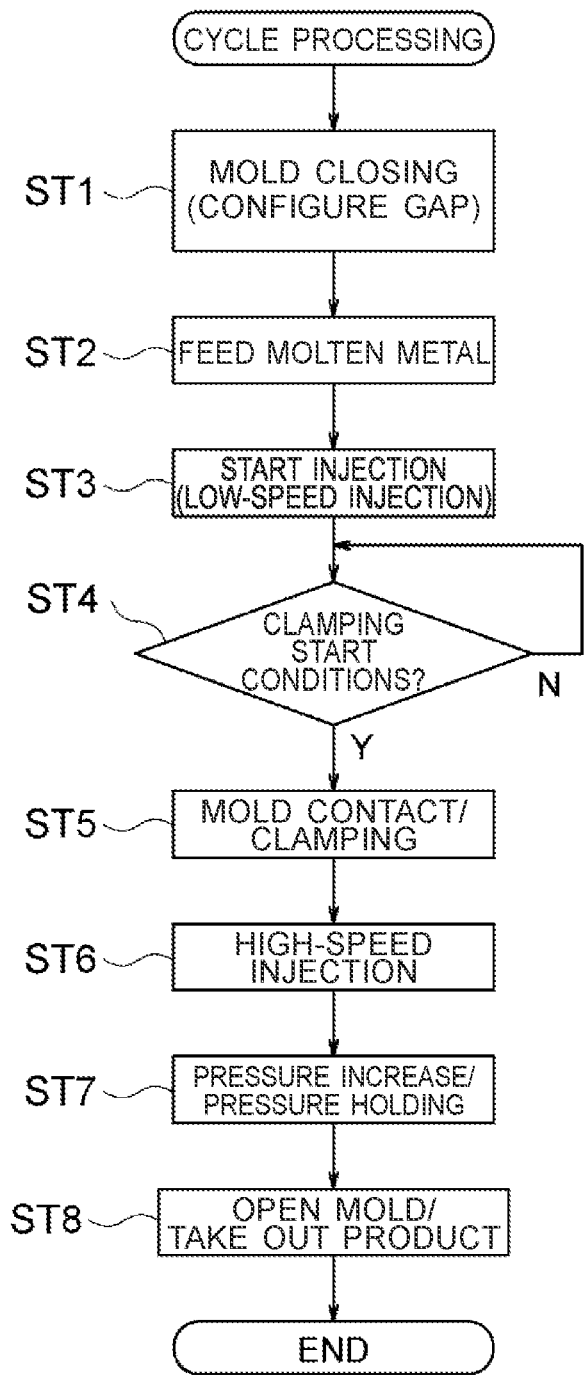
FIG. 11 is a flow chart showing one example of a procedure of cycle processing executed by a control device in the die casting machine equipped with dies in FIG. 1.

(One Example of Procedure of Processing by Control Device) FIG. 11 is a flow chart showing one example of the procedure of cycle processing executed by the control device 67 in order to realize the casting cycle explained hitherto. This processing is, for example, repeatedly executed triggered by operation of the input device 69 to start the cycle.

Before step ST1, the die casting machine 1 has become the state shown in FIG. 1 and FIG. 7A. That is, in the clamping device 7, the die 101 is made the opened state. In the injection device 9, the plunger 41 is positioned at an initial position further to the rear than the molten metal pouring port 39$a$. The molten metal is not arranged in the sleeve 39.

At step ST1, the control device 67 (gap control part 75) controls the clamping device 7 so as to close the mold (FIG. 7B). However, as already explained, this mold-closing is carried out up to before mold-contacting. Due to this, the gap 109 is configured. Specifically, for example, the gap control part 75 outputs a control command to the clamping electric motor 27 so as to rotate the clamping electric motor 27 in a rotation direction of movement of the movable die plate 17 to the mold-closing direction. At this time, the gap control part 75 performs, for example, position feedback control so that the size of the gap 109 stored in the data DT is realized based on the detection value of the encoder 35.

At step ST2, the control device 67 (molten metal feed control part 81) controls the molten metal feed device 13 so that the molten metal is fed to the sleeve 39 (FIG. 8A). Specifically, the molten metal feed control part 81 controls a not shown electric motor in the ladle conveyance device 65 so as to draw up the molten metal M in the holding furnace 59 by the ladle 63 and pour this into the sleeve 39.

At step ST3, the control device 67 (injection control part 79) controls the injection device 9 so that the injection (specifically low-speed injection in the present embodiment) is started (point of time t0 in FIG. 10 and FIG. 8B). In the case of the configuration of the injection device 9 illustrated in FIG. 2A, the injection control part 79 opens the inflowing side valve 53 to feed the hydraulic fluid from the liquid pressure source 49 to the head side chamber 45$h$ and opens the outflow side valve 55 to permit discharge of the hydraulic fluid from the rod side chamber 45$r$.

The speed of the plunger 41 during the low-speed injection is, for example, feedback controlled based on the detection value of the position sensor 57. This speed feedback control may be made one realized by the position feedback control with respect to the target position which is updated every moment based on the predetermined time schedule data. The time schedule data is, for example, time sequence data of the target position prepared at a predetermined time interval. Naturally, usual speed feedback control (control determining the operation amount based on deviation of the speed itself) may be carried out as well. Further, in the case of the configuration illustrated in FIG. 2A, specifically, the degree of opening of the outflow side valve 55, is feedback controlled.

At step ST4, the control device 67 (clamping control part 77) judges whether the clamping start conditions are satisfied. Specifically, in the present embodiment, the clamping control part 77 judges whether the plunger 41 has reached the clamping start position Sc as explained with reference to FIG. 10. Further, the clamping control part 77 stands by at the time of negative judgment, while proceeds to step ST5 at the time of positive judgment.

This judgment may be, for example, carried out by, for example, whether the position of the plunger 41 detected by the position sensor 57 has reached the clamping start position Sc. Further, as described above, in the case where the speed feedback control is substantially carried out by position feedback control with respect to the target value which is updated every moment, it may be judged whether the plunger 41 has reached the clamping start position Sc by whether the point of time corresponding to the target position closest to the value of the clamping start position Sc or the target position which is offset to the front or back by the amount of one time interval from the closet target position has come.

At step ST5, the control device 67 (clamping control part 77) starts reduction of the gap 109 (point of time t1 in FIG. 10) and performs mold contact (point of time t2) and clamping (from point of time t2) (FIG. 9A). Specifically, the clamping control part 77 outputs a control command to the clamping electric motor 27 so as to rotate the clamping electric motor 27 in the rotation direction moving the movable die plate 17 to the mold closing direction and rotates the clamping electric motor 27 until the clamping force F detected by the clamping force sensor 37 reaches the final clamping force Fe stored in the data DT. The clamping control part 77, for example, may perform the feedback control based on the detection value of the clamping force sensor 37 so that the clamping force F converges to the final clamping force Fe.

In the above explanation, for convenience, judgment of whether the plunger 41 has reached the clamping start position Sc is carried out, and reduction of the gap 109 is started at the time of the positive judgment. However, it is also possible to prevent such judgment from being carried out. For example, the time sequence data of the target value of the clamping electric motor 27 may be prepared up to a suitable timing (for example up to mold contact), and only the control based on the time sequence data of the target position of the clamping electric motor 27 may be carried out synchronously with the control based on the time sequence data of the target position of the plunger 41.

At step ST6, the control device 67 (injection control part 79) controls the injection device 9 so as to perform the high-speed injection (points of time t4 to t5 or t6 in FIG. 10). That is, when the plunger 41 reaches the high-speed switching position $S_H$ (point of time t4), the injection control part 79 controls the injection driving part 43 so that the speed of the plunger 41 is switched from the low-speed injection speed $V_L$ to the high-speed injection speed $V_H$. In the case of configuration of the injection driving part 43 illustrated in FIG. 2A, for example, the injection control part 79 maintains the opening state of the inflowing side valve 53 continuing after the low-speed injection, while makes the degree of opening of the outflow side valve 55 larger than that at the time of low-speed injection.

The speed of the plunger 41 during the high-speed injection may be feedback controlled based on the detection value of the position sensor 57 in the same way as the speed of the plunger 41 during the low-speed injection. That is, the speed feedback control may be substantially carried out by position feedback control with respect to the target position which is updated every moment, or the usual speed feedback control based on the deviation of the speed itself may be carried out.

Note that, in a case where position feedback control with respect to the target position updated every moment is continuously carried out from the low-speed injection to the high-speed injection, the high-speed switching position $S_H$ is utilized at the time of preparation of the time sequence data of the target position spanning from the start of low-speed injection to the end of high-speed injection. In other words, the judgment of whether the plunger 41 has reached the high-speed switching position $S_H$ during the injection need not be carried out either. Naturally, the judgment of whether the plunger 41 has reached the high-speed switching position $S_H$ may be carried out, the target speed in the usual speed feedback control based on the deviation of the speed itself may be switched, and the like.

At step ST7, the control device 67 (injection control part 79) controls the injection device 9 so as to perform the pressure increase (points of time t5 to t6 in FIG. 10) and pressure holding (point of time t6 and on). However, the high-speed injection and the pressure increase need not always be able to be clearly differentiated or defined either. In particular, in a case where use is made of a single barrel type injection cylinder 45 as shown in FIG. 2A, the two need not be able to be clearly differentiated or defined either. Naturally, switching from the speed control to the pressure control may be carried out, and that point of time of switching may be grasped as the switching point of time from the high-speed injection to the pressure increase to clearly differentiate or define them.

At step ST8, the control device 67 judges whether the molten metal has solidified based on the passed time or the like. When judging the solidification, the control device 67 controls the clamping device 7 so as to open the mold and controls the ejection device 11 so as to take the product out of the die 101. Further, the control device 67 ends the cycle processing (starts the next cycle processing). Note that, although not particularly shown, other than this, a suitable step may be inserted, for example, cleansing of the die 101 or coating of a mold releasing agent is carried out at a suitable timing.

As explained above, the die casting machine 1 according to the present embodiment has a horizontal clamping type clamping device 7, horizontal injection type injection device 9, molten metal feed device 13, and control device 67. The clamping device 7 performs opening/closing and clamping of the die 101 (fixed die 103 and movable die 105). The injection device 9 moves the plunger 41 forward in the sleeve 39 communicated with the cavity Ca in the die 101 and injects the molten metal into the cavity Ca. The molten metal feed device 13 feeds the molten metal into the sleeve 39. The control device 67 controls the clamping device 7, injection device 9, and molten metal feed device 13. The control device 67 has the gap control part 75, molten metal feed control part 81, injection control part 79, and clamping control part 77. The gap control part 75 controls the clamping device 7 so that the mating surfaces 103a and 105a in the die 101 face each other across the gap 109 and the cavity Ca and the external part of the die 101 communicate across the gap 109 (FIG. 7B). The molten metal feed control part 81 controls the molten metal feed device 13 so as to feed the molten metal into the sleeve 39 when the gap 109 is being maintained (FIG. 8A). The injection control part 79 controls the injection device 9 so as to start the forward movement of the plunger 41 at the time when the gap 109 is maintained and there is molten metal in the sleeve 39 (FIG. 8B). The clamping control part 77 controls the clamping device 7 so as to make the mating surfaces 103a and 105a abut against each other to eliminate the gap 109 after the forward movement of the plunger 41 is started and before the molten metal reaches the molten metal surface height H2 at which the molten metal flows into the gap 109 (FIG. 9A).

From another viewpoint, the dies-equipped die casting machine DC1 according to the present embodiment has the die casting machine 1 as explained above and the die 101 held in the clamping device 7. The die 101 includes the flow divider 107 which is fit in a lower side part in the opening of the sleeve 39 on the die 101 side of the sleeve 39 at the time when the gap 109 is configured and thereby dam the molten metal in the sleeve 39.

From still another viewpoint, the die casting process according to the present embodiment is a die casting process using the horizontally clamping and horizontally injecting die casting machine 1 and has a gap configuring step (ST1), molten metal feeding step (ST2), injection steps (ST3 and ST6), and clamping step (step ST5). The gap configuring step makes the mating surfaces 103a and 105a in the die 101 face each other across the gap 109 and makes the cavity Ca in the die 101 and the external part of the die 101 communicate across the gap 109 (FIG. 7B). The molten metal feeding step feeds the molten metal into the sleeve 39 communicated with the cavity Ca at the time when the gap 109 is maintained (FIG. 8A). The injection step starts the forward movement of the plunger 41 in the sleeve 39 toward the die 101 at the time when the gap 109 is maintained and there is molten metal in the sleeve 39 (FIG. 8B). The clamping step makes the mating surfaces 103a and 105a abut against each other and thereby eliminates the gap 109 after the start of forward movement of the plunger 41 and before the arrival of the molten metal at the molten metal surface height H2 at which the molten metal flows into the gap 109 (FIG. 9A).

Accordingly, in the present embodiment, even in the horizontally clamping and horizontally injecting die casting machine 1, by utilizing the phenomenon that the molten metal does not immediately flow into the gap 109 at the time when the molten metal is fed into the sleeve 39 in a state where the gap 109 is formed, the initial operation of injection can be carried out in the state where the gap 109 is configured. As a result, for example, degassing of the cavity Ca can be efficiently carried out in the initial stage of injection. Due to this, for example, blow holes and the quantity of gas in the die casting product can be reduced, the tensile strength can be improved, and the quality of the outer appearance can be improved. Further, the back pressure in the die can be reduced, and in turn the influence of the back pressure exerted upon the injection control and flow of molten metal is reduced. Also according to this, the quality of the die casting product can be improved.

The inventors of the present application confirmed the above effects being exhibited by experiments. A part thereof will be shown below. The casting was carried out according to the usual die casting process of starting the injection after performing the clamping (comparative example) and according to the die casting process in the present embodiment making the size of the gap 109 2 mm (example). As a result, the ratio of the blow holes (ratio of the volume of the blow holes occupied in the volume of the product) in the example was 80% to 90% of the ratio of blow holes in the comparative example. If heat treatment was carried out after casting, the difference in the ratio of blow holes between the comparative example and the example became conspicuous. The ratio of blow holes in the example was 40% to 80% of the ratio of blow holes in the comparative example. The volume of gas (regardless of the type of gas) contained in the product per unit mass of the product in the example was about 90% of that of the comparative example. In more detail, the volume of $H_2$ gas per unit mass in the example was 70% to 90% of that of the comparative example. The reason for this is believed to be evaporation of the moisture content in the mold-releasing agent and discharge of it from the gap 109. The volume of the C-based gas per unit mass in the example was about 80% of that of the comparative example. The reason for this is believed to be discharge of the gas generated due to the oil for lubricating the plunger 41 from the gap 109. The tensile strength in the example was about 1.02 times to 1.12 times the tensile strength in the comparative example.

In the present embodiment, the injection control part 79 controls the injection device 9 so as to move the plunger 41 forward without stopping the plunger from the start of forward movement of the plunger 41 in the state where the gap 109 is maintained up to elimination of the gap 109 and completion of filling of the molten metal into the cavity Ca (from the point of time t0 to the point of time t5 or t6 in FIG. 10).

In this case, for example, compared with an aspect where forward movement of the plunger 41 is once stopped after the start of forward movement of the plunger 41, and the mold contact and clamping are carried out during that temporary stopping (this aspect may also be included in the art according to the present disclosure), the cycle time can be made shorter. From another viewpoint, the cycle time can be made the same degree as the conventional one. Note that, from the present embodiment, a technique which is not predicated on horizontal clamping and horizontal injection and is focused on the point that the plunger 41 is not once stopped can be extracted.

Further, in the present embodiment, the clamping control part 77 controls the clamping device 7 so that the clamping is completed before the arrival of the molten metal at the molten metal surface height H2 at which the molten metal flows into the gap 109.

In this case, for example, compared with an aspect where mold contact is carried out or clamping has been carried out halfway at the time when the molten metal reaches the molten metal surface height H2 (this aspect may also be included in the art according to the present disclosure), the probability of flow of the molten metal into the gap 109 can be reduced. Note that, unlike the present embodiment, in an aspect where mold contact is carried out or clamping has been carried out halfway at the time when the molten metal reaches the molten metal surface height H2, for example, the timing of start of reduction of the gap 109 is delayed and thereby the time for degassing through the gap 109 can be made longer.

Further, in the present embodiment, the injection control part 79 controls the injection device 9 so as to switch the speed of the plunger 41 from the predetermined low-speed injection speed $V_L$ to the predetermined high-speed injection speed $V_H$ higher than the former after the start of forward movement of the plunger 41. The clamping control part 77 controls the clamping device 7 so that the clamping is completed before switching of the speed of the plunger 41 to the high-speed injection speed $V_H$.

In this case, for example, the clamping is completed before the start of the high-speed injection. Therefore, compared with an aspect where the mold contact is carried out or the clamping has been carried out halfway at the time when the high-speed injection is started (this aspect may also be included in the art according to the present disclosure), the probability of the molten metal intruding into the gap 109 due to the injection pressure at the time of high-speed injection to cause burrs can be lowered. Note that, unlike the present embodiment, in an aspect where the mold contact is carried out or the clamping has been carried out halfway at the time of start of the high-speed injection, for example, the timing of starting reduction of the gap 109 is made later and thereby the time for performing degassing through the gap 109 can be made longer.

Further, in the present embodiment, the injection control part 79 controls the injection device 9 so as to switch the speed of the plunger 41 from the predetermined low-speed injection speed $V_L$ to the high-speed injection speed $V_H$ higher than the former at the time when the plunger 41 reaches the predetermined high-speed switching position $S_H$. The control device 67 has the clamping start position identifying part 85 which identifies the position before the high-speed switching position $S_H$ by the predetermined movement distance d1 as the clamping start position Sc. The clamping control part 77 starts the control of reducing the gap 109 at the time when the plunger 41 reaches the clamping start position Sc.

In this case, for example, the reduction of the gap 109 is started based on the change of position of the plunger 41. Therefore, even if an error arises in the actual molten metal surface height due to the position error of the plunger 41, the probability that the molten metal will end up reaching the molten metal surface height H2 before the gap 109 is eliminated can be lowered. Further, for example, the clamping start position Sc is set using the high-speed switching position $S_H$ as the standard, therefore the relationship between the start position of high-speed injection and the position for start of reduction of the gap 109 is made clear and thereby it becomes easier to obtain a desired clamping force at the time of start of high-speed injection. For example, by suitably setting the movement distance d1, the clamping can be reliably completed by the time of start of the high-speed injection.

Further, in the present embodiment, the clamping start position identifying part 85 identifies a distance obtained by multiplying the low-speed injection speed $V_L$ by the predetermined clamping time T1 as the movement distance d1.

In this case, the timing of starting reduction of the gap 109 is set in accordance with the low-speed injection speed $V_L$. As a result, for example, when the low-speed injection speed $V_L$ is relatively fast, reduction of the gap 109 is started in an early stage and thus the probability of flow of the molten metal into the gap 109 can be lowered. On the other hand, when the low-speed injection speed $V_L$ is relatively slow, the start of reduction of the gap 109 is delayed and thereby it becomes possible to prolong the degassing time.

Further, in the present embodiment, the clamping start position identifying part 85 identifies the total of the required time T2 which is necessary from the start of control of starting reduction of the gap 109 up to the completion of the clamping, and the predetermined margin time T3 as the clamping time T1.

In this case, the time of starting the reduction of the gap 109 is set according to the size of the gap 109 and the performance of the mold clamping device 7. As a result, for example, when the gap 109 is relatively large, it is possible to start reduction of the gap 109 at an early stage and reduce the probability that the molten metal will flow into the gap 109. On the other hand, when the gap 109 is relatively small, the start of reduction of the gap 109 can be delayed and the degassing time can be lengthened. Further, by adding the margin time T3, for example, it is possible to reduce the probability that an unexpected situation will occur due to a control error.

<Modifications>

In the following explanation of modifications, basically parts different from the embodiment will be explained. Matters which are not particularly explained may be considered similar to the embodiment. Further, for convenience, configurations which are different in configuration from the embodiment, sometimes notations attached to the configuration in the embodiment will be attached.

(First Modification)

Figure 12A:
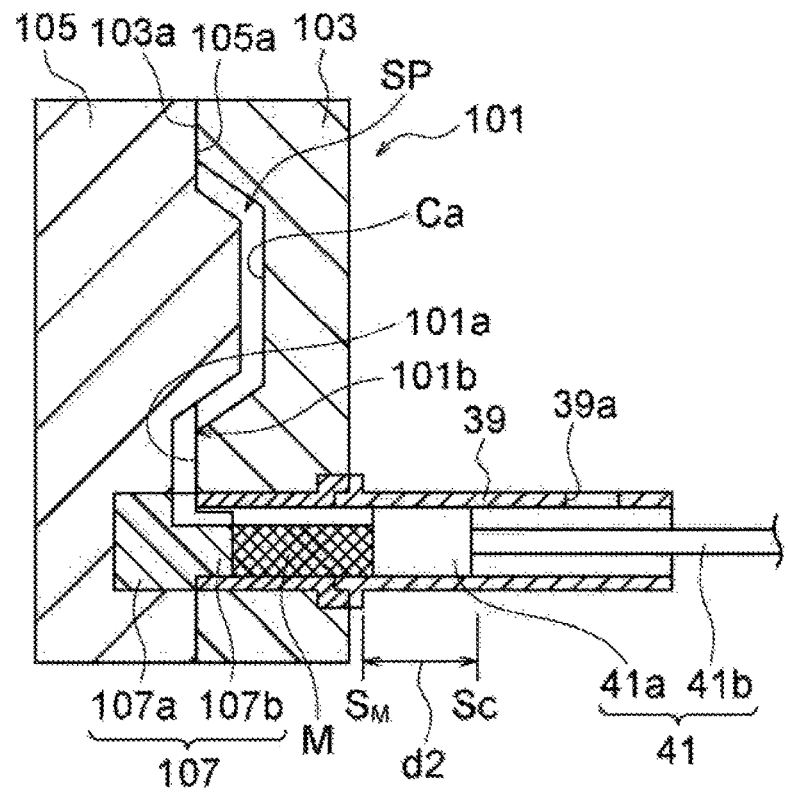
FIG. 12A and FIG. 12B are a cross-sectional view and block diagram for explaining a modification.
Figure 12B:
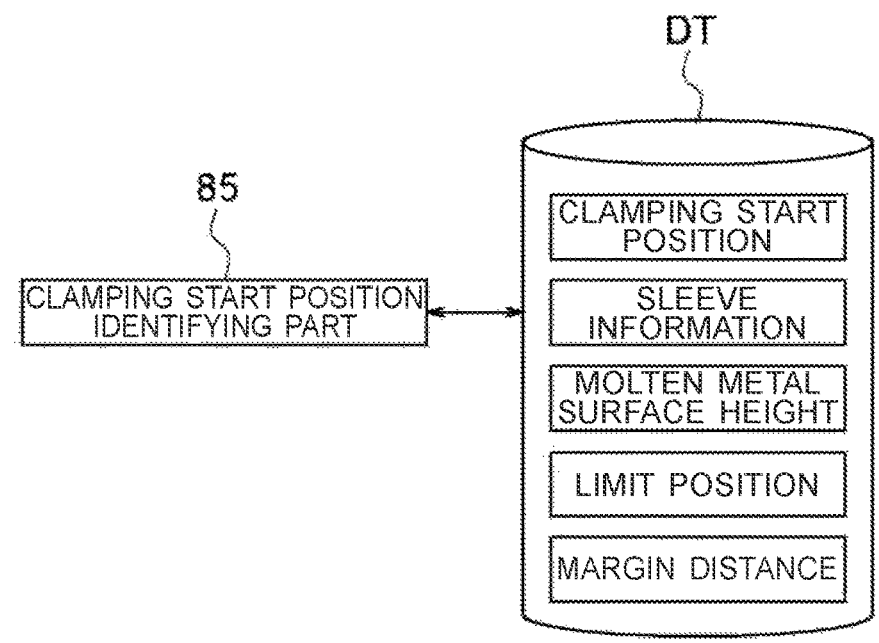

FIG. 12A is a schematic cross-sectional view for explaining a first modification and corresponds to a state between FIG. 9A and FIG. 9B. FIG. 12B is a block diagram for explaining the first modification and corresponds to a part of FIG. 6.

In the embodiment, the clamping start position Sc for starting reduction of the gap 109 was set using the high-speed switching position $S_H$ as the standard. In the present embodiment, as shown in FIG. 12A, the clamping start position Sc is set using the position (limit position $S_M$) of the plunger 41 at the time when the molten metal reaches the molten metal surface height H2 at which the molten metal flows into the gap 109 (see FIG. 5B) as the standard. Specifically, this is as follows.

Assuming that the shape and dimensions of the interior of the sleeve 39, the shape and dimensions of the runner 101a, and the volume of 1 shot's worth of the molten metal M are already determined, the molten metal surface height of the molten metal M in the sleeve 39 is uniquely found according to the position of the plunger 41. In other words, the position (limit position $S_M$) of the plunger 41 at the time when the molten metal flows into the gap 109 is uniquely found from the molten metal surface height H2. The position before this limit position $S_M$ by the predetermined margin distance d2 is made the clamping start position Sc. Further, in the same way as the embodiment, reduction of the gap 109 is started at the time when the plunger 41 reaches the clamping start position Sc. Due to this, before the molten metal flows into the gap 109, the mold contact can be carried out, the clamping can be carried out in the middle, or the clamping can be completed.

In setting of such a clamping start position Sc, in place of the molten metal surface height H2, use may be made of the molten metal surface height H1 or molten metal surface height Ht (FIG. 5B) as well. The molten metal surface height Ht may be, for example, set by the manufacturer of the die casting machine 1, operator, or control device 67 based on the molten metal surface height H1 and/or H2 or the like. Further, the molten metal surface height Ht may be the molten metal surface height H1 or H2 as well. Accordingly, in the following explanation, sometimes use will be made of the molten metal surface height Ht as representative of the molten metal surface heights H1, H2, and Ht. Further, the value of the filling ratio of the molten metal in the sleeve 39 may be set by the manufacturer of the die casting machine 1, operator, or control device 67, and the above molten metal surface height Ht may be calculated from this filling rate.

The role of the control device 67 at the time of setting the clamping start position Sc may be suitably set. For example, in the data DT, information of the shape and dimensions of the interior of the sleeve 39 and the shape and dimensions of the runner 101a, the volume of 1 shot's worth of the molten metal M, and the value of the molten metal surface height Ht are stored. The clamping start position identifying part 85 in the control device 67 identifies the value of the limit position $S_M$ based on these information. Further, in the data DT, the value of the margin distance d2 is stored. The clamping start position identifying part 85 calculates the clamping start position Sc from the identified value of the limit position $S_M$ and the value of the margin distance d2 in the data DT.

If the clamping start position identifying part 85 identifies the clamping start position Sc in this way, the information of the shape and dimensions of the interior of the sleeve 39 and the shape and dimensions of the runner 101a which are stored in the data DT only have to include the values required for identification of the value of the limit position $S_M$. For example, in a case where the influence of the shape and dimensions of the runner 101a exerted upon the correlation between the position of the plunger 41 and the actual surface height of the molten metal M is zero or small before the arrival of the molten metal at the molten metal surface height Ht, the information concerning the shape and dimensions of the runner 101a need not be stored in the data DT. Assuming the shape of the sleeve 39 is a cylinder, only the value of the diameter of the sleeve 39 may be stored in the data DT.

The various information required for identification of the value of the limit position $S_M$ may be, for example, directly input or indirectly input by the input of the related information by operation of the input device 69 by the operator, and be stored in the data DT. For example, the diameter of the sleeve 39 (from another viewpoint, diameter of the plunger tip 41a) is directly input by operation of the input device 69. The volume of 1 shot's worth of molten metal is, for example, calculated based on the filling mass input by operation of the input device 69 and the type of the material of the molten metal selected by operation of the input device 69 (density of the molten metal stored in the data DT linked with the type) etc. The value of the molten metal surface height Ht is, for example, stored in the data DT by operation of the input device 69 by the operator. However, the value of the molten metal surface height Ht may be calculated by the clamping start position identifying part 85 based on the information of the shape and dimensions of the interior of the sleeve 39 and the shape and dimensions of the runner 101a which are stored in the data DT.

The processing for identifying the limit position $S_M$ from the molten metal surface height Ht may be made a suitable one. For example, the clamping start position identifying part 85 may calculate the limit position $S_M$ from the molten metal surface height Ht according to a calculation formula or a map linking the position S of the plunger 41 and the surface height of the molten metal at the time when the plunger 41 is at that position S may be generated and the position S corresponding to the molten metal surface height Ht may be identified as the limit position $S_M$ with reference to this map.

One example of the calculation formula will be shown below. Consider a case where the molten metal M is in the cylindrical sleeve 39 as indicated by a two-dot chain line in FIG. 5B. The height from the lower end of the sleeve 39 to the molten metal surface of the molten metal M is defined as "h". The radius of the sleeve 39 is defined as "r". The area of the transverse cross-section of the molten metal M which is perpendicular to the axial direction of the sleeve 39 is defined as "A". As shown in FIG. 8B, the length of the molten metal M in the axial direction of the sleeve 39 is defined as "L". The volume of the molten metal M is defined as "V" (illustration is omitted). At this time, the following formula (1) and formula (2) stand:

$$V = A \times L \quad (1)$$

$$A = h \times \sqrt{(r^2 - h^2)} - r^2 \cos^{-1}(h/r) + \pi r^2 \quad (2)$$

From formula (1), A=V/L. When this is entered into Formula (2) to modify it, the following stands:

$$L = (h \times \sqrt{(r^2 - h^2)} - r^2 \cos^{-1}(h/r) + \pi r^2)/V \quad (3)$$

Here, the values of "V" and "r" are made already determined values directly or indirectly by operation of the input device 69 by the operator. Accordingly, if use is made of the molten metal surface height Ht as "h", the length "L" at the time when the molten metal M reaches the molten metal surface height Ht is calculated and in turn the position S (limit position $S_M$) of the plunger 41 at that time is calculated.

Note that, strictly speaking, as will be understood from FIG. 8B, the size of the gap 109 exerts an influence upon the limit position $S_M$. However, usually the size of the gap 109 is sufficiently small relative to the length "L" at the time when the molten metal M reaches the molten metal surface height Ht, therefore the size of the gap 109 may be ignored. Naturally, the processing as described above may be carried out using the state of elimination of a gap 109 where the molten metal surface of the molten metal M would become relatively high as the standard.

The margin distance d2 may be suitably set. For example, the margin distance d2 may be calculated by the same calculation method as that for the movement distance d1 in the embodiment. In this case, the clamping can be reliably completed before the molten metal reaches the molten metal surface height Ht. Other than this, the margin distance d2 may be made a value obtained by multiplying the low-speed injection speed $V_L$ by the required time T2 or may be made a value obtained by multiplying the low-speed injection speed $V_L$ by the time T4. The margin distance d2 may be set by the manufacturer of the die casting machine 1, may be set by the operator through the input device 69, or may be calculated by the clamping start position identifying part 85 in the control device 67.

In the above explanation, the clamping start position identifying part 85 in the control device 67 calculated the limit position $S_M$. However, the operator may calculate the limit position $S_M$ and store the same in the data DT through the input device 69 and the input setting part 83 in the control device 67. Further, the operator may calculate the clamping start position Sc based on the limit position $S_M$ and the margin distance d2 and store the clamping start position Sc in the data DT through the input device 69 and input setting part 83.

As explained above, in the first modification, the control device 67 has the clamping start position identifying part 85 which acquires information concerned with the predetermined molten metal surface height (for example the molten metal surface height H2 at which the molten metal flows into the gap 109), identifies a position of the plunger 41 at the time when the molten metal reaches the molten metal surface height H2, and identifies a position before the former position by the predetermined margin distance d2 as the clamping start position Sc. The clamping control part 77 starts the control reducing the gap 109 at the time when the plunger 41 reaches the clamping start position Sc.

In this case, for example, as already explained, the clamping start position Sc is set using the limit position $S_M$ at which the molten metal reaches the molten metal surface height H2 as the standard, therefore elimination of the gap 109 before the arrival of the molten metal at the gap 109 is facilitated. Note that, in the embodiment, the clamping start position Sc, which exerts an influence upon degassing, is set using the high-speed switching position $S_H$, which exerts an influence upon the flow of the molten metal, as the standard, therefore the influence of degassing exerted upon the flow of molten metal is easily adjusted.

Note that, the information concerned with the predetermined molten metal surface height may be the molten metal surface height by itself or may be information able to identify the molten metal surface height like the molten metal filling rate in the sleeve 39. The identification of the position of the plunger 41 at the time when the molten metal reaches the predetermined molten metal surface height (molten metal surface height H2 etc.) may be calculated as already explained using the state eliminating the gap 109 as the standard.

(Second Modification)

Figure 13:
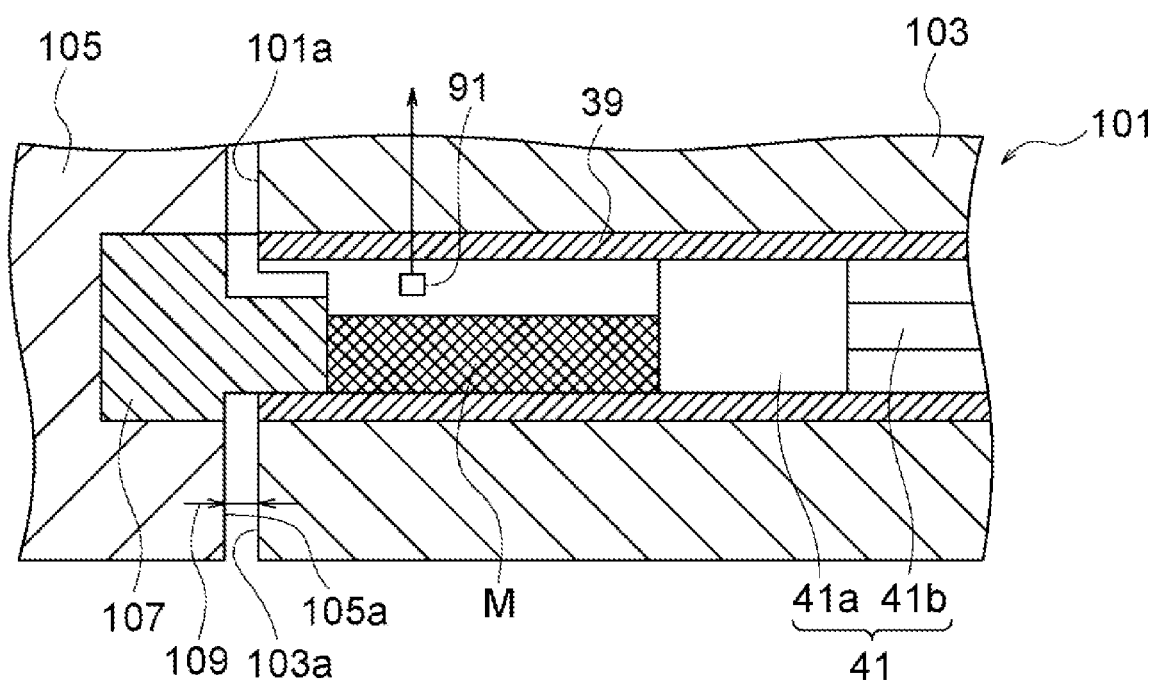
FIG. 13 is a cross-sectional view for explaining another modification.

FIG. 13 is a schematic cross-sectional view for explaining a second modification and corresponds to a part of the state as shown in FIG. 8B.

In the embodiment and first modification, reduction of the gap 109 was started based on the position S of the plunger 41. In contrast to this, in the second modification, the molten metal surface sensor 91 is provided in the sleeve 39, and reduction of the gap 109 is started at the time of the detection by the molten metal surface sensor 91 that the molten metal M has reached the predetermined molten metal surface height Ht. The molten metal surface height Ht is, for example, set by the manufacturer or user of the die casting machine 1 based on the molten metal surface height H1 and/or H2 and the like, may be the molten metal surface height H1 or H2, and may be a height different from them.

The configuration of the molten metal surface sensor 91 may be made a suitable one. For example, the molten metal surface sensor 91 may be made a conduction sensor. The conduction sensor, for example, although not particularly shown, has a pair of electrodes which are exposed in the sleeve 39 and are positioned at the molten metal surface height Ht. Further, when the molten metal in the sleeve 39 contacts the pair of electrodes, the pair of electrodes are electrically connected. Further, when the pair of electrodes are electrically connected, the molten metal surface sensor 91 outputs a signal showing that. Other than this, the molten metal surface sensor 91 can be configured by, for example, a temperature sensor which detects the temperature of the molten metal or a pressure sensor which detects the pressure of the molten metal.

As explained above, in the second modification, the die casting machine 1 further has the molten metal surface sensor 91 which detects the arrival of the molten metal in the sleeve 39 at the molten metal surface height Ht. At the time of detection of the arrival of the molten metal at the molten metal surface height Ht by the molten metal sensor 91, the clamping control part 77 starts the control for reducing the gap 109.

In this case, for example, the molten metal surface height of the molten metal pushed by the plunger 41 is directly detected. Therefore, in a case where 1 shot's worth of the molten metal becomes larger due to measurement error, the probability of flow of the molten metal into the gap 109 can be reduced.

The art according to the present disclosure is not limited to the above embodiment and modifications and may be worked in various ways.

For example, as referred to in the embodiment, the die casting machine is not limited to a horizontally clamping and horizontally injecting one. Further, the horizontal clamping and horizontal injection die casting machine is not limited to one in which the mold opening/closing direction and plunger driving direction are horizontal, but may be one in which the mold opening/closing direction and plunger driving direction are inclined at an angle less than a predetermined angle (for example less than 45°, less than 30°, or less than 15°) relative to the horizontal direction. Further, the die casting machine is not limited to one feeding the molten metal to the sleeve by the ladle, but may be one feeding the molten metal from a molten metal feed pipe connected to the sleeve like in a so-called semi-hot chamber type die casting machine.

In the embodiment, the clamping device was made an electric motor type, and the injection device was made a liquid pressure type. However, the electric motor type and the liquid pressure type may be suitably combined. For example, both of the clamping device and the injection device may be made electric motor types, both may be made liquid pressure types, or the clamping device may be made a liquid pressure type and the injection device may be made an electric motor type. Further, at least one of the clamping device and injection device may be made a hybrid type combining an electric motor type and liquid pressure type. The clamping device is not limited to a toggle type. For example, it may be one separately provided with the driving part (for example screw mechanism) performing opening/closing of the mold and the driving part (for example clamping cylinder) performing clamping.

The injection device is not limited to one performing low-speed injection and high-speed injection. It may be one performing so-called laminar flow filling as well. Further, in the injection device, between the low-speed injection and the high-speed injection, not only the speed, but also the operation may be different. For example, the low-speed injection may be carried out electrically, and the high-speed injection may be carried out by hydraulic pressure. The low-speed injection may be carried out by the hydraulic pressure from the pump, and the high-speed injection may be carried out by the hydraulic pressure from the accumulator. There may be various differences between the injection (narrow sense) and pressure increase as well.

The various sensors are not limited to the ones shown in the embodiment either. For example, in the embodiment, the distance between the mating surfaces in the dies was detected by the encoder of the electric motor. However, it may be measured by a laser length measuring device or linear encoder etc. provided in the dies or die plates. Further, for example, the clamping force sensor may be configured by a position sensor detecting the position of the clamping piston as well.

The gap between the mating surfaces in the dies need not be configured by closing the mold before the mold contact, but may be configured by opening the mold a little from the closed state. Further, the operation for identifying the mold contact position may be carried out before formation of the gap and thereby improve the accuracy of the size of the gap as well. Such a technique is disclosed in Japanese Patent Publication No. 2017-094367. The content of Japanese Patent Publication No. 2017-094367 is incorporated by reference in the present disclosure. Note that, the above publication relates to molding of metal in the solid-liquid coexisting state, therefore is different from the art according to the present disclosure in the point that the mold contact and clamping are carried out after filling the metal material into the cavity is completed etc.

Various methods for determining the timing of starting reduction of the gap between the mating surfaces in the dies are possible other than those shown in the embodiment and modifications. For example, reduction of the gap may be started at the time when the pressure detected by the back pressure sensor provided in the chill vent rises up to the predetermined pressure as well. Further, the contents in the embodiment and modifications may be suitably combined. For example, the clamping start position set using the high-speed switching position shown in the embodiment as the standard may be basically used while it may be judged whether this clamping start position exceeds the clamping start position set using the molten metal surface height shown in the first modification as the standard and the display device may be made to display an alert image when it is over.

In the horizontal clamping and horizontal injection type, the configuration for preventing the molten metal from flowing into the gap when feeding the molten metal to the sleeve in a state where a gap is formed is not limited to one according to a flow divider. For example, the molten metal may be prevented from flowing into the gap by the sleeve being inclined so that the die side becomes the upper side. Further, the part which becomes the dam may be integrally configured with the die body, a dam may be provided in the sleeve (fixed die side), or a movable dam that retracts from the runner during advance of the injection may be provided.

REFERENCE SIGNS LIST

1 . . . die casting machine, 7 . . . clamping device, 9 . . . injection device, 13 . . . molten metal feed device, 39 . . . sleeve, 41 . . . plunger, 67 . . . control device, 75 . . . gap control part, 77 . . . clamping control part, 79 . . . injection control part, 81 . . . molten metal feed control part, 101 . . . die, 103 . . . fixed die (die), 103a . . . mating surface (of fixed die), 105 . . . movable die (die), 105a . . . mating surface (of movable die), 107 . . . flow divider, 109 . . . gap, and M . . . molten metal.

The invention claimed is:
1. A die casting machine comprising:
a clamping device configured to perform opening, closing, and clamping of a pair of dies, wherein a mold opening/closing direction of the clamping device is inclined at an angle less than 45° relative to a horizontal direction or is arranged in the horizontal direction;
an injection device configured to make a plunger move forward in a sleeve communicated with a cavity between the pair of dies to thereby inject a molten metal into the cavity, wherein a plunger driving direction of the injection device is inclined at an angle less than 45° relative to the horizontal direction or is arranged in the horizontal direction;
a molten metal feed device configured to feed the molten metal into the sleeve; and
a control device configured to control the clamping device, the injection device, and the molten metal feed device, wherein the control device comprises:
- a gap control part configured to control the clamping device so as to make mating surfaces of the pair of dies face each other across a gap, and thereby the cavity and an external part of the pair of dies are communicated with each other across the gap,
- a molten metal feed control part configured to control the molten metal feed device so as to feed the molten metal into the sleeve while the gap is being maintained,
- an injection control part configured to control the injection device so as to start a forward movement of the plunger while the gap is maintained and there is the molten metal in the sleeve, and
- a clamping control part configured to control the clamping device so as to make the mating surfaces abut against each other to eliminate the gap after start of the forward movement of the plunger and before the molten metal has reached a molten metal surface height at which the molten metal flows into the gap.

2. The die casting machine according to claim 1, wherein the injection control part is configured to control the injection device so as to make the plunger move forward without stopping the plunger from the start of the forward movement of the plunger in a state where the gap is maintained until the gap is eliminated and filling of the molten metal into the cavity is completed.

3. The die casting machine according to claim 1, wherein the clamping is completed before arrival of the molten metal at a molten metal surface height at which the molten metal flows into the gap.

4. The die casting machine according to claim 1, wherein:
- the injection control part is configured to control the injection device so as to switch a speed of the plunger from a predetermined low injection speed to a predetermined high injection speed higher than the low injection speed after the start of the forward movement of the plunger, and
- the clamping control part is configured to control the clamping device so that the clamping is completed before the speed of the plunger is switched to the high injection speed.

5. The die casting machine according to claim 1, wherein:
- the injection control part is configured to control the injection device in response to the plunger reaching a predetermined high-speed switching position so as to switch a speed of the plunger from a predetermined low-speed injection speed to a predetermined high-speed injection speed higher than the low-speed injection speed,
- the control device comprises a clamping start position identifying part configured to identify a position before the high-speed switching position by a predetermined movement distance as a clamping start position, and
- the clamping control part is configured to start a control of reducing the gap in response to the plunger reaching the clamping start position.

6. The die casting machine according to claim 5, wherein the clamping start position identifying part is configured to identify a distance obtained by multiplying the low-speed injection speed by a predetermined clamping time as the movement distance.

7. The die casting machine according to claim 6, wherein the clamping start position identifying part is configured to identify a total of a time needed up to completion of clamping from a start of reduction of the gap and a predetermined margin time as the clamping time.

8. The die casting machine according to claim 1, wherein:
- the control device comprises a clamping start position identifying part configured to acquire information concerned with a predetermined molten metal surface height, identify a position of the plunger in response to the molten metal reaching the predetermined molten metal surface height which is acquired, and identify a position before the former position by a predetermined margin distance as a clamping start position, and
- the clamping control part is configured to start a control of reducing the gap in response to the plunger reaching the clamping start position.

9. The die casting machine according to claim 1, further comprising a molten metal surface sensor configured to detect arrival of the molten metal in the sleeve at a predetermined molten metal surface height, wherein
- the clamping control part is configured to start a control of reducing the gap in response to arrival of the molten metal at the predetermined molten metal surface height being detected by the molten metal surface sensor.

10. A die casting machine equipped with dies comprising:
the die casting machine according to claim 1 and
the pair of dies which are held in the clamping device, wherein
the pair of dies include a flow divider which is fit in a lower side part of an opening of the sleeve on a die side of the sleeve while the gap is being formed and dams the molten metal in the sleeve.

11. A die casting process using the die casting machine according to claim 1, the die casting process comprising:
- a gap forming step of making the mating surfaces face each other across the gap to make the cavity and the external part of the pair of dies communicate across the gap,
- a molten metal feeding step of feeding the molten metal into the sleeve when the gap is being maintained,
- an injection step of starting the forward movement of the plunger at the time when the gap is maintained and there is the molten metal in the sleeve, and
- a clamping step of making the mating surfaces abut against each other to eliminate the gap after the start of the forward movement of the plunger and before the arrival of the molten metal at the molten metal surface height at which the molten metal flows into the gap.

12. A die casting machine comprising:
- a clamping device configured to perform opening, closing, and clamping of a pair of dies;
- an injection device configured to make a plunger move forward in a sleeve communicated with a cavity between the pair of dies to thereby inject a molten metal into the cavity;
- a molten metal feed device configured to feed the molten metal into the sleeve; and
- a control device configured to control the clamping device, the injection device, and the molten metal feed device, wherein
the control device comprises:
- a gap control part configured to control the clamping device so as to make mating surfaces of the pair of dies face each other across a gap, and thereby the cavity and an external part of the pair of dies are communicated with each other across the gap,
- a molten metal feed control part configured to control the molten metal feed device so as to feed the molten metal into the sleeve while the gap is being maintained, an injection control part configured to control the injection device so as to start a forward movement of the plunger while the gap is maintained and there is the molten metal in the sleeve, and a clamping control part configured to control the clamping device so as to make the mating surfaces abut against each other to eliminate the gap after a start of the forward movement of the plunger and before the molten metal has reached a molten metal surface height at which the molten metal flows into the gap, and the injection control part is configured to control the injection device so as to make the plunger move forward without stopping the plunger from the start of the forward movement of the plunger in a state where the gap is maintained until the gap is eliminated and filling of the molten metal into the cavity is completed.

13. A control device for a die casting machine, configured to control a machine body in a die casting machine wherein a mold opening/closing direction is inclined at an angle less than 45° relative to a horizontal direction or is arranged in the horizontal direction and a plunger driving direction is inclined at an angle less than 45° relative to the horizontal direction or is arranged in the horizontal direction, comprising:

a gap control part configured to control the machine body so as to make mating surfaces of a pair of dies face each other across a gap, and thereby a cavity in the pair of dies and an external part of the pair of dies are communicated across the gap;

a molten metal feed control part configured to control the machine body so as to feed molten metal into a sleeve communicated with the cavity while the gap is being maintained;

an injection control part configured to control the machine body so as to start a forward movement of a plunger in the sleeve toward the pair of dies while the gap is maintained and there is the molten metal in the sleeve; and a clamping control part configured to control the machine body so as to make the mating surfaces abut against each other to eliminate the gap after a start of the forward movement of the plunger and before arrival of the molten metal at a molten metal surface height at which the molten metal flows into the gap.

* * * * *